United States Patent
Ramasamy et al.

(10) Patent No.: US 11,874,929 B2
(45) Date of Patent: Jan. 16, 2024

(54) METHOD AND SYSTEM FOR AUTOMATICALLY IDENTIFYING AND CORRECTING SECURITY VULNERABILITIES IN CONTAINERS

(71) Applicant: Accenture Global Solutions Limited, Dublin (IE)

(72) Inventors: Manoharan Ramasamy, Bangalore (IN); Satish Janardhanan, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 267 days.

(21) Appl. No.: 16/707,514

(22) Filed: Dec. 9, 2019

(65) Prior Publication Data

US 2021/0173935 A1 Jun. 10, 2021

(51) Int. Cl.
  *G06F 21/57* (2013.01)
  *G06F 16/23* (2019.01)
  *G06F 21/55* (2013.01)
  *G06F 9/455* (2018.01)

(52) U.S. Cl.
  CPC ........ *G06F 21/577* (2013.01); *G06F 16/2379* (2019.01); *G06F 21/552* (2013.01); *G06F 2009/45587* (2013.01); *G06F 2221/033* (2013.01); *G06F 2221/034* (2013.01)

(58) Field of Classification Search
  CPC ...... G06F 21/577; G06F 21/57; G06F 21/552; G06F 21/53; G06F 2009/45587
  See application file for complete search history.

(56) References Cited

U.S. PATENT DOCUMENTS

| | | | | |
|---|---|---|---|---|
| 8,613,080 | B2 * | 12/2013 | Wysopal | G06F 21/577 726/19 |
| 8,712,596 | B2 | 4/2014 | Scott | |
| 9,811,668 | B2 * | 11/2017 | Sabetta | G06F 21/577 |
| 9,825,982 | B1 * | 11/2017 | Htay | G06F 21/577 |
| 10,002,247 | B2 * | 6/2018 | Suarez | G06F 9/45558 |
| 10,142,204 | B2 * | 11/2018 | Nickolov | H04L 41/0869 |

(Continued)

OTHER PUBLICATIONS

Souppaya, et al., https://doi.org/10.6028/NIST.SP.800-190, Application Container Security Guide, NIST Special Publication 800-190, 63 pgs., September 2017.

(Continued)

*Primary Examiner* — Zachary A. Davis
(74) *Attorney, Agent, or Firm* — Crowell & Moring LLP

(57) ABSTRACT

Systems and methods are provided to identify security vulnerabilities related to containerization platforms. Container images may be received from a repository, and scanned for security vulnerabilities. Containers may be automatically generated and updated with security updates when the images are extracted and identified. Updated versions of images may be generated based on the updated containers. Stored security vulnerability may be automatically updated with CVE information received from external databases at regular intervals, or upon receiving a scan request. Scan results may be generated, stored and compared. Vulnerability comparisons may be generated for an initial version of an image and an updated version of the image that includes the implemented security updates that rectify the identifiable security vulnerabilities.

11 Claims, 22 Drawing Sheets

(56) References Cited

U.S. PATENT DOCUMENTS

| | | | | |
|---|---|---|---|---|
| 10,402,569 | B2* | 9/2019 | Cui | G06F 21/577 |
| 10,534,915 | B2* | 1/2020 | Cherny | G06F 21/577 |
| 10,601,807 | B2* | 3/2020 | Sweet | H04L 63/08 |
| 10,732,960 | B2* | 8/2020 | Kannan | G06F 11/3664 |
| 10,885,200 | B2* | 1/2021 | Ciano | G06F 21/577 |
| 10,891,003 | B2* | 1/2021 | Howard | G06V 40/28 |
| 10,896,260 | B2* | 1/2021 | Nadgowda | H04L 41/082 |
| 11,030,022 | B2* | 6/2021 | Cho | G06F 9/543 |
| 11,106,784 | B2* | 8/2021 | Rosendahl | G06F 21/577 |
| 2017/0109536 | A1* | 4/2017 | Stopel | G06F 21/577 |
| 2018/0027009 | A1* | 1/2018 | Santos | H04L 63/1441 |
| | | | | 726/25 |
| 2018/0088935 | A1* | 3/2018 | Church | G06F 11/3051 |
| 2018/0309747 | A1 | 10/2018 | Sweet et al. | |
| 2019/0050319 | A1 | 2/2019 | Gondalia et al. | |

OTHER PUBLICATIONS

Tak, Byungchul et al., "Understanding Security Implications of Using Containers in the Cloud", 2017 USENIX Annual Technical Conference, 7 pages.

Martin, A. et al., "Docker ecosystem—Vulnerability Analysis", Computer Communications 122 (2018), 14 pages Femando, Anuradha, "CoreOS Clair—Part 1: Container Image Scanning", Apr. 20, 2021, 5 pages Extended European Search Report on European application 20206397.0, dated May 11, 2021, 11 pages.

Office Action in India Application No. 202044048805, dated Sep. 29, 2021, 8 pages.

* cited by examiner

109

Choose image for scan

Select Container Registry:
Container Registry*
414 — Docker Hub ▼

Select the Image type for Scan:
413 — ○ Public  ● Private

Select From existing projects or create a new project:
Select Project Name          New Project Name
415 — default ▼        or   default 801 — Please use your Registry Login Credentials

Docker Hub UserName*
xyz

Docker Hub Password**
****

Enter the image name:
Image Name*
412 — alpine:zyz|

CLEAR   SCAN   ← 802

Choose image for scan

Select Container Registry:
Container Registry*
414 — [Docker Hub ▼]

Select the Image type for Scan:
413 — ◉ Public   ○ Private

Select From existing projects or create a new project:
Select Project Name     New Project Name
415 — [default ▼]   or   [default]

Enter the image name:
Image Name*
412 — [mysql:5.6]

[CLEAR]  [SCAN]  ← 901

Figure 9

| CVE-ID | Severity | Description | Reference Url |
|---|---|---|---|
| CVE-2018-16868 | Low | A Bleichenbacher type side-channel based padding oracle attack was found in the way gnutls handles verification of RSA decrypted PKCS#1 v1.5 data. An attacker who is able to run process on the same physical core as the victim process, could use this to extract plaintext or in some cases downgrade any TLS connections to a vulnerable server. | https://security-tracker.debian.org/tracker/CVE-2018-16868 |
| CVE-2019-9937 | Low | In SQLite 3.27.2, interleaving reads and writes in a single transaction with an fts5 virtual table will lead to a NULL Pointer Dereference in fts5ChunkIterate in sqlite3.c. This is related to ext/fts5/fts5_hash.c and ext/fts5/fts5_index.c. | https://security-tracker.debian.org/tracker/CVE-2019-9937 |
| CVE-2019-9936 | Low | In SQLite 3.27.2, running fts5 prefix queries inside a transaction could trigger a heap-based buffer over-read in fts5HashEntrysort in sqlite3.c, Which may lead to an information leak. This is related to ext/fts5/fts5_hash.c. | https://security-tracker.debian.org/tracker/CVE-2019-9936 |
| CVE-2018-9234 | Low | GnuPG 2.2.4 and 2.2.5 does not enforce a configuration in which key certification requires an offline master Certify key, which results in apparently valid certifications that occurred only with access to a signing subkey. | https://security-tracker.debian.org/tracker/CVE-2018-9234 |
| CVE-2018-7169 | Low | An issue was discovered in shadow 4.5. newgidmap (in shadow-utils) is setuid and allows an unprivileged user to be placed in a user namespace where setgroups(2) is permitted. This allows an attacker to remove themselves from a supplementary group. which may allow access to certain filesystem paths if the administrator has used "group blacklisting" (e.g., chmod g-rwx) to restrict access to paths. This flaw effectively reverts a security feature in the kernel (in particular, the /proc/self/setgroups knob) to prevent this sort of privilege escalation. | https://security-tracker.debian.org/tracker/CVE-2018-7169 |

Figure 11

History

Filter Data By Project Name:
Select Project
All ▼

Search By Image Name ← 1200

| ☐ | Image Name | Project Name | Scan Date/Time | No. of Layers Scanned | Report |
|---|---|---|---|---|---|
| ☐ | mysql | default | Aug 8, 2019, 3:01:21 PM | 12 | View ← 1204 |
| ☐ | mariadb | default | Jul 9, 2019, 3:38:04 PM | 14 | View |
| ☐ | httpd | default | Jul 9, 2019, 11:55:34 AM | 5 | View |
| ☐ | nginx | default | Jul 9, 2019, 11:55:02 AM | 3 | View |
| ☐ | mysql | default | Jul 8, 2019, 3:27:31 PM | 12 | View |

Delete 🗑    Compare Vulnerabilities ← 1203

Items per page: 5 ▼    1 – 5 of 7   |< < > >|

Compare Vulnerabilities

Search By Image Name

| Image Name | Project Name | Scan Date/Time | No. of Layers Scanned |
|---|---|---|---|
| ☑ mysql | default | Aug 8, 2019, 3:01:21 PM | 12 |
| ☐ mariadb | default | Jul 9, 2019, 3:38:04 PM | 14 |
| ☐ httpd | default | Jul 9, 2019, 11:55:34 AM | 5 |
| ☐ nginx | default | Jul 9, 2019, 11:55:02 AM | 3 |
| ☑ mysql | default | Jul 8, 2019, 3:27:31 PM | 12 |

[Compare Vulnerabilities] — 1203

Items per page: 5 ▼    1 - 5 of 7  |< < > >|

Add User

User Name    Password    Select User Role ▾    [ADD USER] ← 1503

Search

| User Name | User Role | Created Date/Time | Added By | | |
|---|---|---|---|---|---|
| sraveen.motupalli | ADMIN | May 21, 2019, 5:30:00 AM | admin | ✎ | ☐ |
| admin | ADMIN | Jun 10, 2019, 6:15:00 PM | admin | ✎ | ☐ |
| testuser | USER | Jun 10, 2019, 1:02:23 PM | admin | ✎ | ☐ |
| testadmin | ADMIN ← 1501 | Jun 10, 2019, 3:12:49 PM | admin | ✎ | ☐ |

Vulnerability Updates

| CVE_ID | UPDATED TIME |
|---|---|
| CVE_2019-13456 | Aug 8, 2019, 2:38:43 PM |
| CVE_2019-13456 | Aug 8, 2019, 2:38:37 PM |
| CVE_2019-14763 | Aug 8, 2019, 2:38:16 PM |
| CVE_2019-13456 | Aug 8, 2019, 2:38:16 PM |
| CVE_2019-13456 | Aug 8, 2019, 2:37:40 PM |

Items per page: 5 ▼    1 - 5 of 10

| CVE ID | libpd_2.4 Description | Severity | CVE ID | libpd_2.4 update Description | Severity |
|---|---|---|---|---|---|
| CVE-2016-2781 | chroot in GNU coreutils, when used with usrespace, allows local users to escape to the parent session via a crafted TIOCSTI ioctl call, which pushes characters to the terminal's input buffer. | Low | | The XFS subsystem in the Linux kernel through 4.8.2 allows local users to cause a denial of service | Low |
| CVE-2016-8660 | The XFS subsystem in the Linux kernel through 4.8.2 allows local users to cause a denial of service (fdatasync failure and system hang) by using the vfs_syscall_group in the trinity program, related to a "page lock order bug in the XFS seek hole/data implementation." | Low | CVE-2016-8660 | (fdatasync failure and system hang) by using the vfs_syscall_group in the trinity program, related to a "page lock order bug in the XFS seek hole/data implementation." | |
| CVE-2017-0630 | An information disclosure vulnerability in the kerneltrace subsystem could enable a local malicious application to access data outside of its permission levels. This issue is rated as Moderate | Low | CVE-2017-0630 | An information disclosure vulnerability in the kerneltrace subsystem could enable a local malicious application to access data outside of its permission levels. This issue is rated as Moderate | Low |
| CVE-2019-3874 | because it first requires compromising a privileged process. Product: Android. Versions: Kernel-3.10, Kernel-3.18, Android ID: A-34277115. The SCTP socket buffer used by a userspace application is not accounted by the cgroups subsystem. An attacker can use this flaw to cause a denial of service attack. Kernel 3.10.x and 4.18.x branches are believed to be vulnerable. | Low | CVE-2019-3874 | because it first requires compromising a privileged process. Product: Android. Versions: Kernel-3.10, Kernel-3.18, Android ID: A-34277115. The SCTP socket buffer used by a userspace application is not accounted by the cgroups subsystem. An attacker can use this flaw to cause a denial of service attack. Kernel 3.10.x and 4.18.x branches are believed to be vulnerable. | Low |
| CVE-2019-15030 | In the Linux kernel through 5.2.14 on the powerpc platform, a local user can read vector registers of other users' processes via a Facility Unavailable exception. To exploit the vulnerability, a local user starts a transaction (via the hardware transactional memory instruction tbegin) and then accesses vector registers. At some point, the vector registers will be corrupted with the values from a different local Linux process because of a missing arch/powerpc/kernel/process.c check. | Low | CVE-2019-15030 | In the Linux kernel through 5.2.14 on the powerpc platform, a local user can read vector registers of other users' processes via a Facility Unavailable exception. To exploit the vulnerability, a local user starts a transaction (via the hardware transactional memory instruction tbegin) and then accesses vector registers. At some point, the vector registers will be corrupted with the values from a different local Linux process because of a missing arch/powerpc/kernel/process.c check. | Low |

METHOD AND SYSTEM FOR AUTOMATICALLY IDENTIFYING AND CORRECTING SECURITY VULNERABILITIES IN CONTAINERS

FIELD OF THE INVENTION

The present disclosure relates in general to the fields of software security and containers that deploy applications, and in particular to methods and systems for scanning and rectifying security vulnerabilities in containers and updating security rules.

BACKGROUND

Basic techniques and platforms for running applications segregated by the use of kernel containerization are known in the art. Linux™ containers are commonly used to deploy applications. Containers improve reproducibility and scalability in software development. Containerization platforms, such as Docker™, enable users to develop, deploy, and run applications inside containers. Containers allow a developer to package up applications with all of the necessary components, such as libraries and other dependencies, and ship out the bundle as one package. Containers are used for web, applications and caching services, network daemons, and small databases.

An image for a container may be a file comprised of multiple layers that may be used to execute code in the container. A container may be the instantiation of an image, such that the container may be the runtime instance of the image. An image may be built from the instructions for a complete and executable version of an application, which relies on the host operating system kernel. A container may be a virtual environment that runs an application that is not dependent on the operating system. The kernel of the host operating system may run the different functions of the application that are separated into containers.

Containers do not offer the same security and stability provided by virtual machines (VMs). A container may share the kernel of the host operating system to run all of the applications with the container. Thus, such apps may not run as isolated as a VM. Containers may be process-level isolated, but one container may affect other containers by compromising the stability of the kernel. A malware attack from a container into the operating system can propagate to other containers, and spread the attack in an uncontrolled manner.

Traditional approaches for running applications inside containers may not ensure sufficient security because containerization lacks isolation from the host OS. Further, conventional systems for scanning containers do not provide useful summary reports for security risks and automatic rule updates. More secure solutions are desired by software developers to automatically identify and rectify security vulnerabilities in containers, and automatically update the set of security rules for such vulnerabilities. Accordingly, there is a need for an automatic correction engine and automatic rule refresh engine to more efficiently and effectively reduce security risks in a containerization platform.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 8 illustrates an exemplary graphical user interface through which a private image for a container may be scanned by the exemplary system depicted in FIG. 1, in accordance with certain embodiments of the present disclosure.

FIG. 9 illustrates an exemplary graphical user interface through which a public image for a container may be scanned by the exemplary system depicted in FIG. 1, in accordance with certain embodiments of the present disclosure.

FIG. 11 illustrates an exemplary graphical user interface for a dashboard depicting security vulnerabilities identified by a scan of an image performed by the exemplary system depicted in FIG. 1, in accordance with certain embodiments of the present disclosure.

FIG. 12 illustrates an exemplary graphical user interface for a history of image scans performed by the exemplary system depicted in FIG. 1, in accordance with certain embodiments of the present disclosure.

FIG. 13 illustrates an exemplary graphical user interface for comparing security vulnerabilities of images scanned by the exemplary system depicted in FIG. 1, in accordance with certain embodiments of the present disclosure.

FIG. 15 illustrates an exemplary graphical user interface through which an user may be added to access reports, history data, and vulnerability comparisons for scans of images performed by the exemplary system depicted in FIG. 1, in accordance with certain embodiments of the present disclosure.

FIG. 16 illustrates an exemplary graphical user interface listing updates for security vulnerabilities added to the scan engine depicted in FIG. 3, in accordance with certain embodiments of the present disclosure.

FIG. 18 illustrates an exemplary home screen view of a graphical user interface through which an user may access the exemplary system depicted in FIG. 1, in accordance with certain embodiments of the present disclosure.

FIG. 19 illustrates an exemplary home screen view of a graphical user interface through which an admin may access the exemplary system depicted in FIG. 1, in accordance with certain embodiments of the present disclosure.

FIG. 21 illustrates two exemplary lists of CVEs and their corresponding severity ratings that catalogs the security vulnerabilities for versions of a container image, in accordance with certain embodiments of the present disclosure.

DETAILED DESCRIPTION OF EMBODIMENTS OF THE INVENTION

Reference will now be made in detail to the embodiments of the present disclosure, examples of which are illustrated in the accompanying drawings.

The present disclosure may be embodied in various forms, including a system, a method, a computer readable medium, or a platform-as-a-service (PaaS) product for scanning and rectifying security vulnerabilities in containerization platforms and updating security rules. In some examples, a technical advantage of the present disclosures described herein is the identification of security vulnerabilities in containers and/or their associated images. Another technical advantage may be correcting such security vulnerabilities by updating the containers and/or their associated images with security updates. Yet another technical advantage may be an ability to automatically update a set of security rules that apply to the containers and/or their associated images. In certain examples, a technical advantage may include the reporting of security vulnerabilities identified by an image scan, and the reporting of vulnerability comparisons for an initial version of an image and an updated version of the image that includes the implemented security updates.

Figure 1:
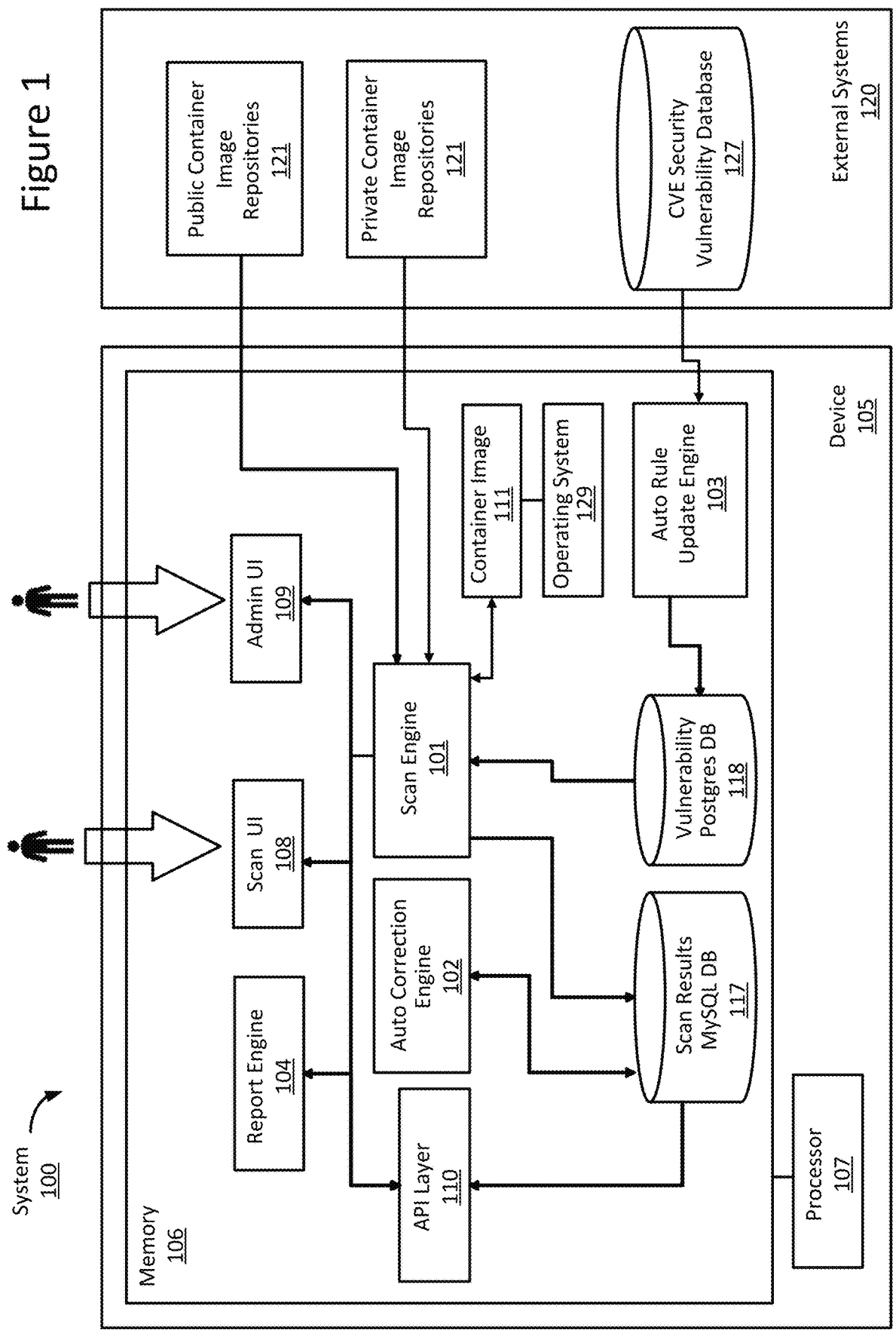
FIG. 1 is a block diagram illustrating an example of an architecture for an exemplary system for identifying, reporting and rectifying security vulnerabilities in a containerization platform, and/or a system for updating security rules in containers, in accordance with certain embodiments of the present disclosure.

FIG. 1 illustrates an embodiment of such a system 100 that may be implemented in many different ways, using various components and modules, including any combination of circuitry described herein, such as hardware, software, middleware, application program interfaces (APIs), and/or other components for implementing the corresponding features of the circuitry. The system 100 may include a scan engine 101, an auto correction engine 102, an auto rule update engine 103, and/or a report engine 104.

In an embodiment, the system 100 may include a computing device 105, which may include a memory 106 and a processor 107. The system 100 may also include generated graphical user interfaces (GUIs), such as a scan user interface (UI) 108 and an admin UI 109, that may be configured to communicate with an API layer 110. As discussed below, users and administrators (admins) may interface with the system 100 via these UIs 108/109. In some embodiments, the memory 106 may include the components and modules of the system 100, including the scan engine 101, the auto correction engine 102, the auto rule update engine 103, the report engine 104, the scan UI 108, the admin UI 109, and the API layer 110.

The scan engine 101 may be configured to scan a container image 111 for security vulnerabilities (not shown). The image 111 may be a binary representation of a container (not shown). The container may be the runtime state of the corresponding image 111. The image 111 may include stackable layers (not shown), also known as intermediate images, which include read-only files that correspond to the filesystem (fs) for the container. A container may include a read-write top layer, with a series of read-only layers of the image 111 underneath it. The read-only layers may be generated by commands executed when a container is built. An image 111 may contain an executable application (not shown) and its runtime dependencies, such as the modules, binaries, libraries, utilities, middleware, packages or configuration files required to setup and run the application. A new layer may be generated when a container is run. A layer may store the difference between the previous and the current version of the image 111. Upon scanning an image 111 for security vulnerabilities, the scan engine 101 may also rectify the identified security vulnerabilities. In addition, the scan engine 101 may generate scan results (not shown), which may be stored in a scan results database 117.

The system 100 may also include a security vulnerability database 118 that stores the security vulnerabilities, and/or security rules (not shown) utilized to identify and/or rectify the security vulnerabilities of the image 111. The scan results database 117 and the security vulnerability database 118 may be logically and physically organized in many different ways, and may be implemented with different types of data structures such as linked lists, hash tables, or implicit storage mechanisms. In an embodiment, the scan results database 117 may be a relational database, such as a MySQL database. The security vulnerability database 118 may be an object-relational database, such as a PostgresSQL database. The databases may be stored in the memory 106 of the device 105, or distributed across multiple devices, processing systems, or repositories. For example, the scan engine 101 and the auto rule update engine 103 may be configured to communicate with various external systems 120.

The scan engine 101 may be further configured to receive container images 111, which may already be stored in the memory 106 or may be received from external systems 120. In an embodiment, a container image 111 may be received from a container image repository 121 of an external system 120. The container image repository 121 may be private or public. In certain embodiments, the received image 111 may be scanned based on the security vulnerabilities and/or the security rules stored in the security vulnerability database 118. In some embodiments, the scan engine 101 may identify certain security vulnerabilities used to scan an image 111 based on security rules (e.g., identifying only those security vulnerabilities that have a certain severity rating 510, as discussed below). The scan engine 101 may be further configured to rectify the identified security vulnerabilities based on the security rules, and/or security updates (discussed below) stored in the security vulnerability database 118. The scan engine 101 may then generate the scan results, which may be stored in the scan results database 117. Scan reports (not shown) displaying the scan results may be generated via the API Layer 110 and the report engine 104. The scan reports may be accessed by users and admins via the scan UI 108 and admin UI 109, respectively.

In certain embodiments, the auto correction engine 102 may analyze scan results for a container image 111 and update the image 111 based on the scan results. A container may be the instantiation of the image 111. Accordingly, the code in the initial image 111 may be executed in order to generate an interactive container that may be modified. That initial container may be modified to rectify security vulnerabilities identified in the scan results. An updated image 111 may be generated from the modified container. In some embodiments, the container may be updated with security patches or update(s) (not shown) based on security vulnerabilities identified in the scan results. The security update may be stored in the security vulnerability database 118. A new version of the image 111 may be generated based on the updated container that includes the necessary security updates. In some embodiments, the security vulnerabilities and/or the security rules that are stored in the security vulnerability database 118 may be updated based on the security updates. The updated image 111 may be re-scanned, in the manner discussed above, and the updated scan results may be stored in the scan results database 117. Updated scan reports displaying the updated scan results (based on the re-scan of the updated image 111) may be generated via the API Layer 110 and the report engine 104. The updated scan reports may be accessed by users and admins via the scan UI 108 and admin UI 109, respectively.

Figure 20:
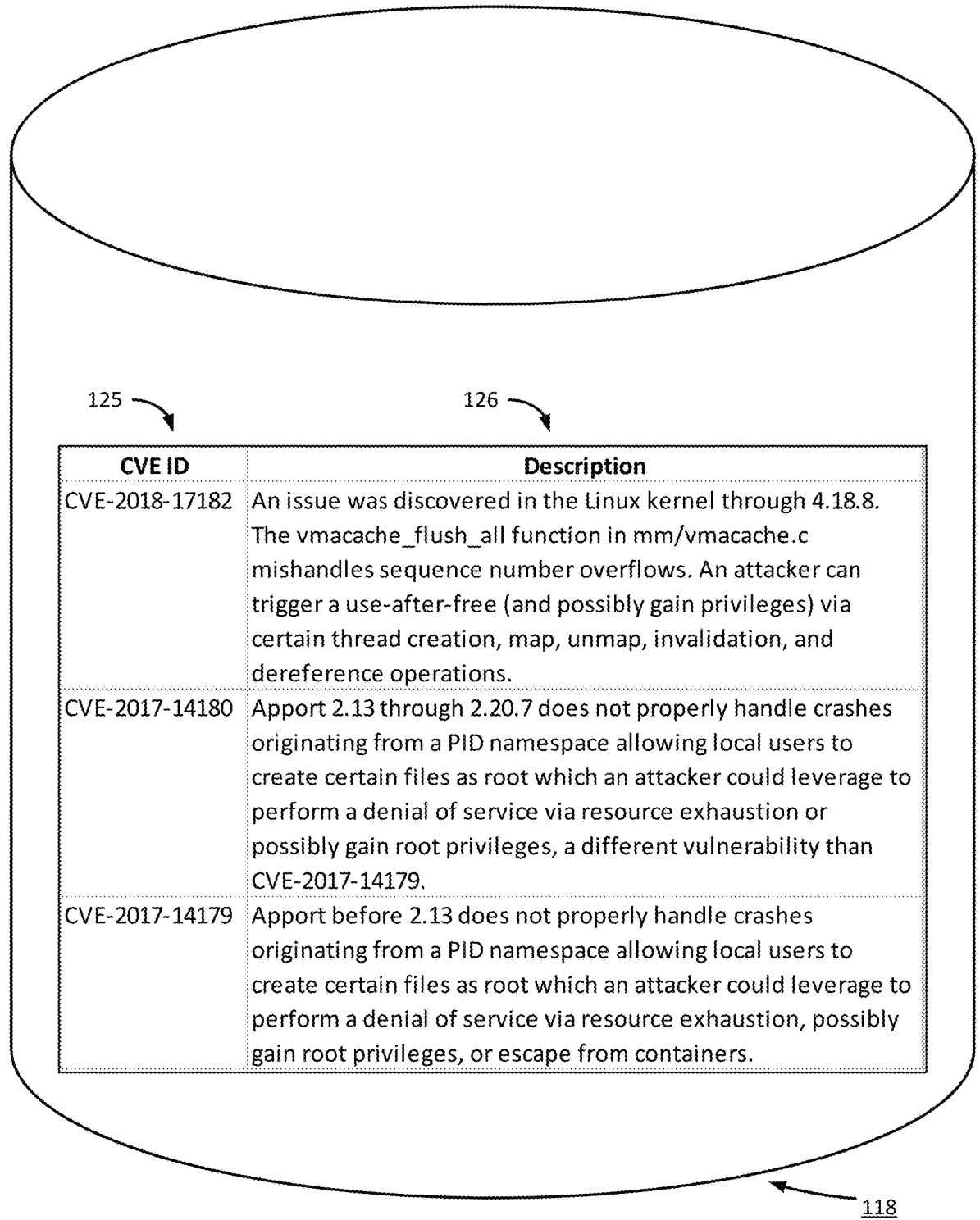
FIG. 20 illustrates an exemplary list of Common Vulnerabilities and Exposures (CVEs) that may be stored in a security vulnerability database, in accordance with certain embodiments of the present disclosure.

The auto rule update engine 103 may be configured to receive Common Vulnerabilities and Exposures (CVEs) from the external systems 120 of CVE Numbering Authorities (CNAs). As shown in FIG. 20, CVEs may include a CVE identification number 125 and a CVE description 126. Referring back to FIG. 1, in certain embodiments, CVEs may be received from a CVE database 127, such as the publically accessible database proffered by the external systems 120 for the U.S. National Institute of Standards and Technology (NIST), which is the U.S. government repository of standards based vulnerability management data. Software vendors (e.g., Debian or RedHat) may also be CNAs, which offer CVEs relating to security vulnerabilities specific to their software. The CVEs may list the identifiable security vulnerabilities that may affect a containerized application, the source code and data of the container, the layers of the image 111, the container engine (not shown), components shared across the containerization platform, the host operating system 129 and its kernel (not shown), and/or the API server. The auto rule update engine 103 utilizes the CVEs to enable automation of vulnerability management, security measurement, and compliance.

In an embodiment, the updated CVEs that are received from a CVE database 127 may be stored in the security vulnerability database 118 in order to update the listing of CVEs, and/or to update the security rules stored in the security vulnerability database 118. As discussed below, the stored CVEs may be supplemented with additional CVEs received from a CVE database 127 that may be checked for updates at regular intervals. The image 111 may be scanned by the scan engine 101 to identify security vulnerabilities based on the updated CVEs, and/or the updated security rules. Accordingly, the scan engine 101 may scan an image 111 for identifiable security vulnerabilities, which may include those security vulnerabilities that are listed in the security vulnerability database 118. The scan engine 101 may generate updated scan results, which may be stored in the scan results database 117. In addition, updated scan reports displaying the updated scan results (based on the re-scan of the image 111 using the updated CVEs and/or the updated security rules) may be generated via the API Layer 110 and report engine 104. The updated scan reports may be accessed via the scan UI 108 and admin UI 109, respectively, in order to compare the security vulnerabilities between the two versions of the same image 111. Based on such a vulnerability comparison, the system 100 may determine the success rate of the updated CVEs and/or the updated security rules based on the newly received CVEs and/or the security patches/updates used to update a container.

Figure 2:
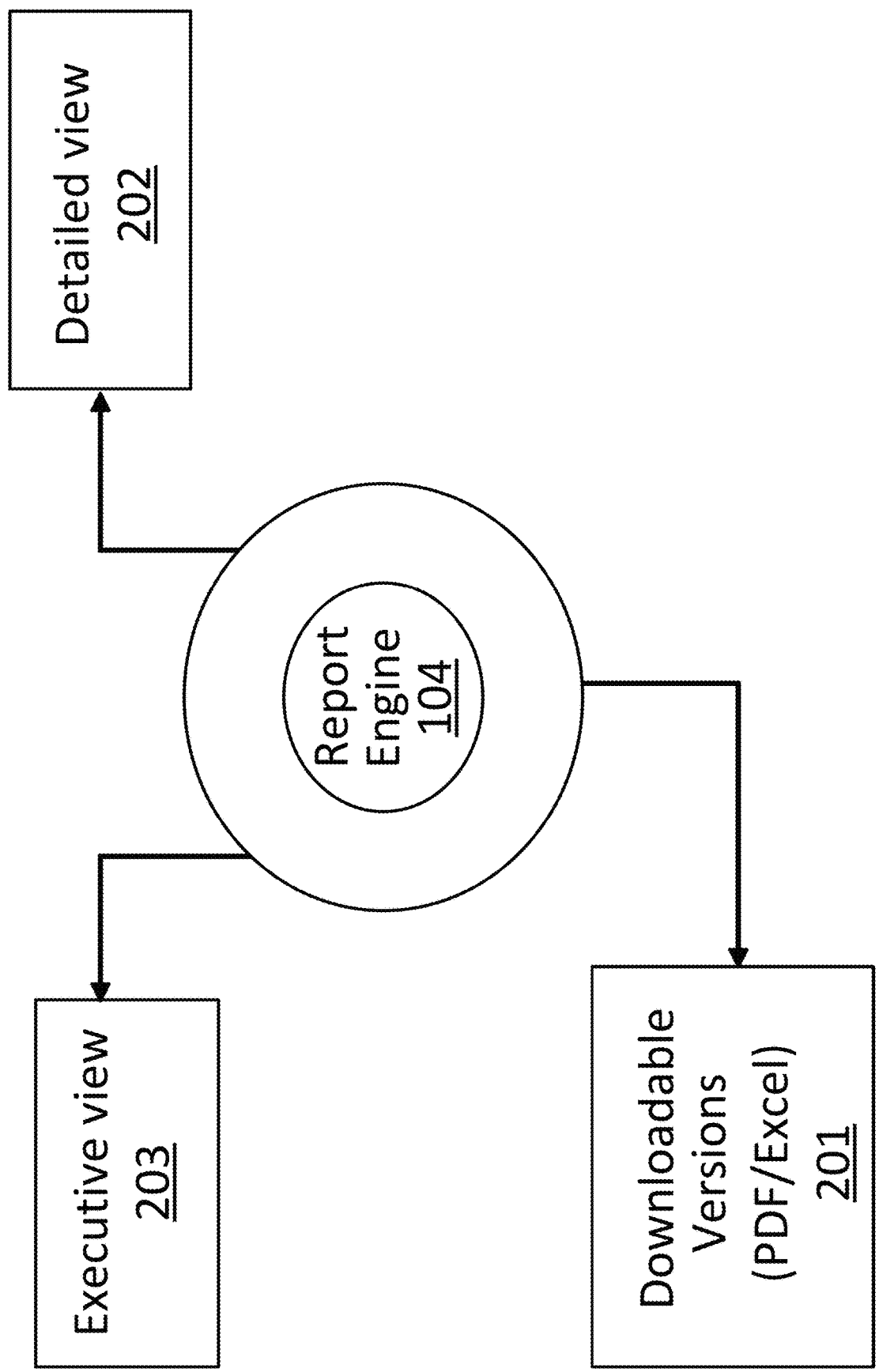
FIG. 2 is a block diagram illustrating an embodiment of a report engine for implementing the exemplary system depicted in FIG. 1, in accordance with certain embodiments of the present disclosure.

FIG. 2 illustrates an embodiment of a report engine 104 for generating scan reports based on scan results generated by the scan engine 101. In an embodiment, the report engine 104 receives scan results that are stored in the scan results database 117 via the API Layer 110. Based on scan results, the report engine 104 may generate scan reports in various formats. For example, the report engine 104 may generate downloadable files 201 (such as a PDF file or a Microsoft Excel™ file) that render the scan results. In addition, the report engine 104 may render the scan results through an API or GUI, such as the scan UI 108 or the admin UI 109. Such renderings may include a detailed view 202 and/or an executive view 203.

Figure 3:
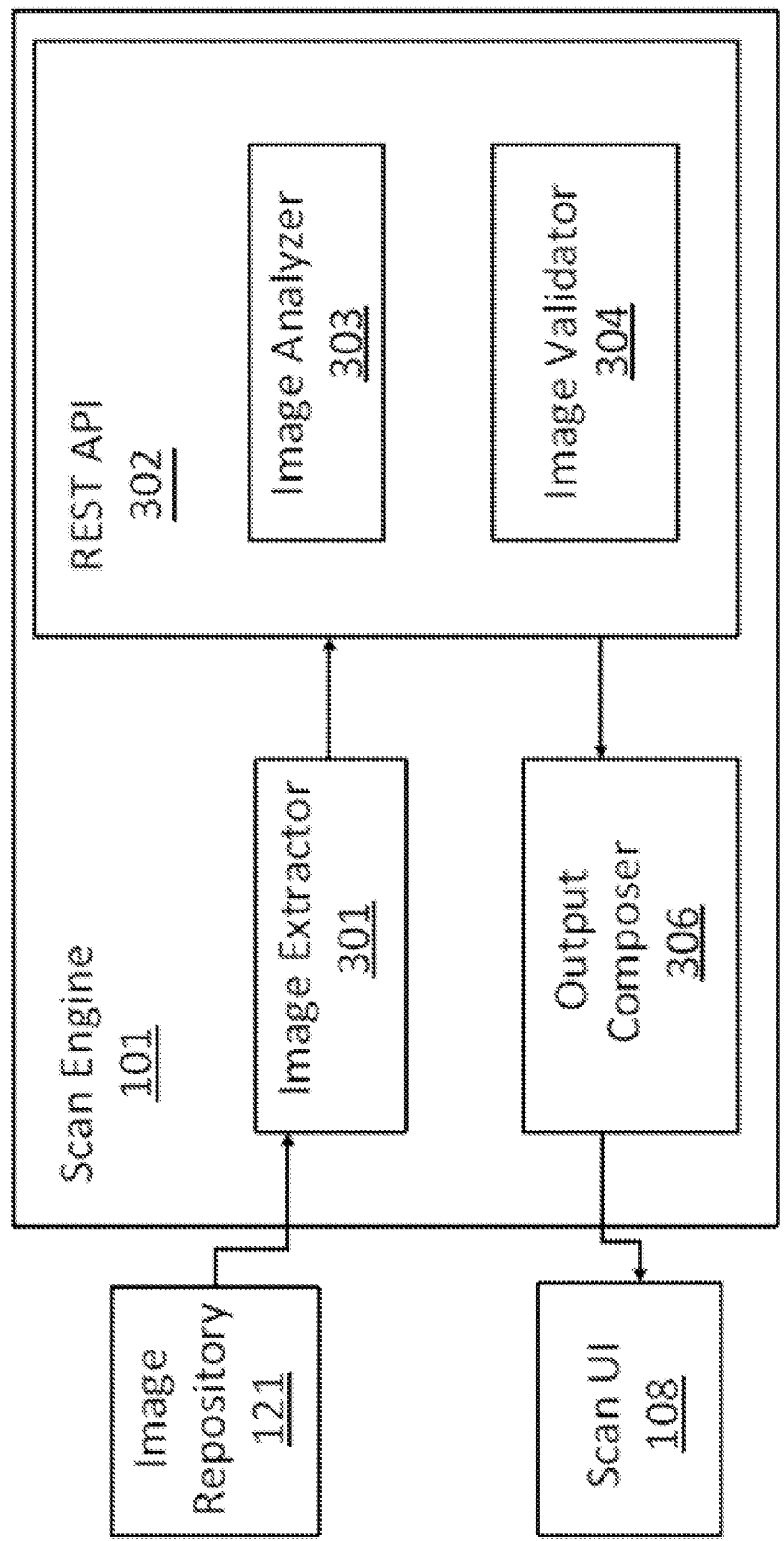
FIG. 3 is a block diagram illustrating an embodiment of a scan engine for implementing the exemplary system depicted in FIG. 1, in accordance with certain embodiments of the present disclosure.

FIG. 3 is a diagram showing components of the scan engine 101 and the interactions between the scan engine 101 and a container image repository 121 and a scan UI 108, in accordance with certain embodiments. A container image 111 may be received by the scan engine 101 from the image repository 121, which may reside in an external system 120 such as a Docker™ repository where collections of Docker™ images 111 are publically stored. Because images 111 and their corresponding containers may be immutable, a new version of the image 111 may necessarily be generated if any changes are implemented to an existing image 111. Accordingly, an image 111 may have an identifier such as a unique hash. In addition, a container image 111 may be labeled with metadata that further enables the management of the image 111 and its corresponding container. For example, an image 111 may be tagged with labels or metadata that describe the code used to build the image 111 and the repository 121 from which the image 111 was received. The metadata may include an image URL that identifies a webpage having more information about the particular image 111. A new version of an image 111 may include the labels/metadata of its ancestor image 111 because metadata may be inherited.

In some embodiments, the scan engine 101 may include an image extractor 301 and a Representational State Transfer (REST) API 302. The image extractor 301 may receive the metadata of the image 111 from the repository 121 and transfer the metadata to the REST API 302. The REST API 302 may include an image analyzer 303 and an image validator 304. The image analyzer 303 may read the metadata of an image 111 and analyze its individual image layers for security vulnerabilities. The image validator 304 may validate each image layer against previous scan data (not shown), such as metadata of images 111 that were previously scanned by the scan engine 101. An output composer 306 may collect scan data of the scanned image 111 from the REST API 302, and compose the scan data in various formats (e.g., JSON and text) which can be further configured and transmitted to the scan UI 108 or the admin UI 109. The scan data may be configured by the API layer 110 and/or the report engine 104.

Figure 4:
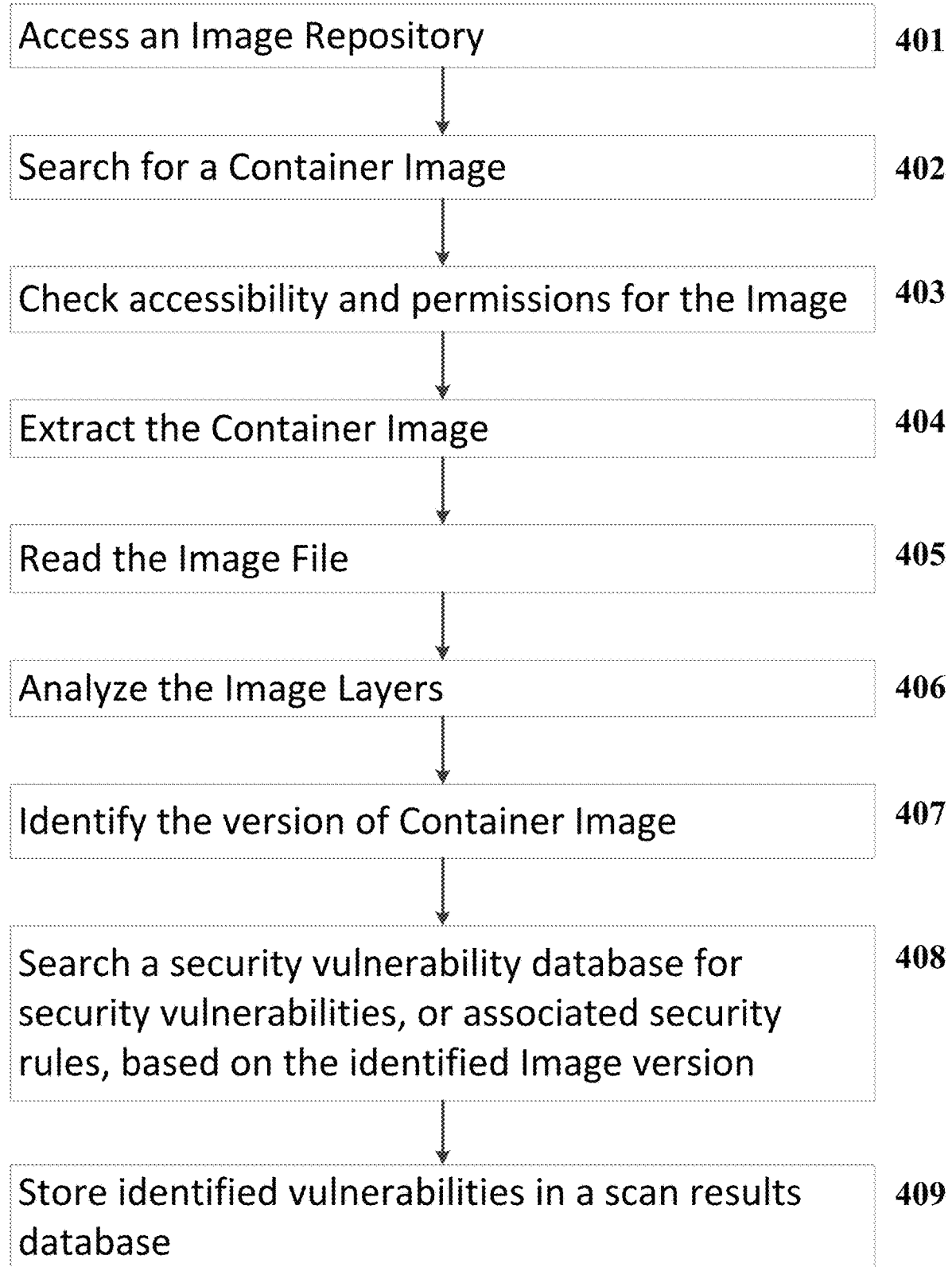
FIG. 4 is a flow diagram illustrating an example of a method implemented by the scan engine depicted in FIG. 3, in accordance with certain embodiments of the present disclosure.

FIG. 4 is a flowchart illustrating exemplary steps of processes and methods for scanning a container image 111 for security vulnerabilities via a scan engine 101, as implemented in accordance with certain embodiments. The processes described herein may be implemented by the system 100, the computing device 105, a computer readable medium, a PaaS product, and/or circuitry components as described herein. As shown in FIG. 4, a scan engine 101 may: access a container image repository 121 (block 401); and search for a container image 111 (block 402). For example, the scan engine 101 may access a Docker™ repository 121 and search for a Docker™ image 111. In an embodiment, the scan engine 101 may check the accessibility and permissions associated with the image 111 in order to determine any restrictions assigned by the repository 121 (block 403). The scan engine 101 may: receive and/or extract the image 111 (block 404); and read the image 111 (block 405) (e.g., read the metadata from the image layers of the image file 111). These two steps may be performed by the image extractor 301 and the REST API 302, respectively. The scan engine 101 may analyze the individual image layers of the image 111 (block 406). For example, the metadata of each image layer may be analyzed and validated against previous scan data by the image validator 304.

In addition, the scan engine 101 may identify the version of the image 111 (block 407). In an embodiment, this may include identification of the executable software/application of the image 111. The scan engine 101 may search the security vulnerability database 118 for security vulnerabilities, and/or any security rules associated with such security vulnerabilities. In an embodiment, this scan may be based on the identified version for the application (block 408). In addition, the scan engine 101 may retrive the identified security vulnerabilities based on the version of the software/application, and store the identified security vulnerabilities as being associated with the scanned image 111 in the scan results database 117 (block 409). The security vulnerabilities stored in association with the scanned image 111 in the scan results database 117 may be transmitted to the report engine 104.

In an embodiment, as an initial step of the method, the scan engine 101 may receive a scan request (not shown) to scan an image 111 based on an image name 412, image type 413 (e.g., public or private), container image registry 414, and/or project name 415. Upon receiving such a scan request, the scan engine 101 may access the container image repository 121 (block 401) and search for a container image 111 (block 402). In an embodiment, the scan engine 101 may download a private or public container (not shown) for scanning. The container may be downloaded from the repository 121, and may correspond to the image 111 requested by the scan request. The downloaded container may be scanned for security vulnerabilities identified as being associated with the requested image 111. In some embodiments, the scan request may be received via the scan UI 108 or admin UI 109.

Figure 5:
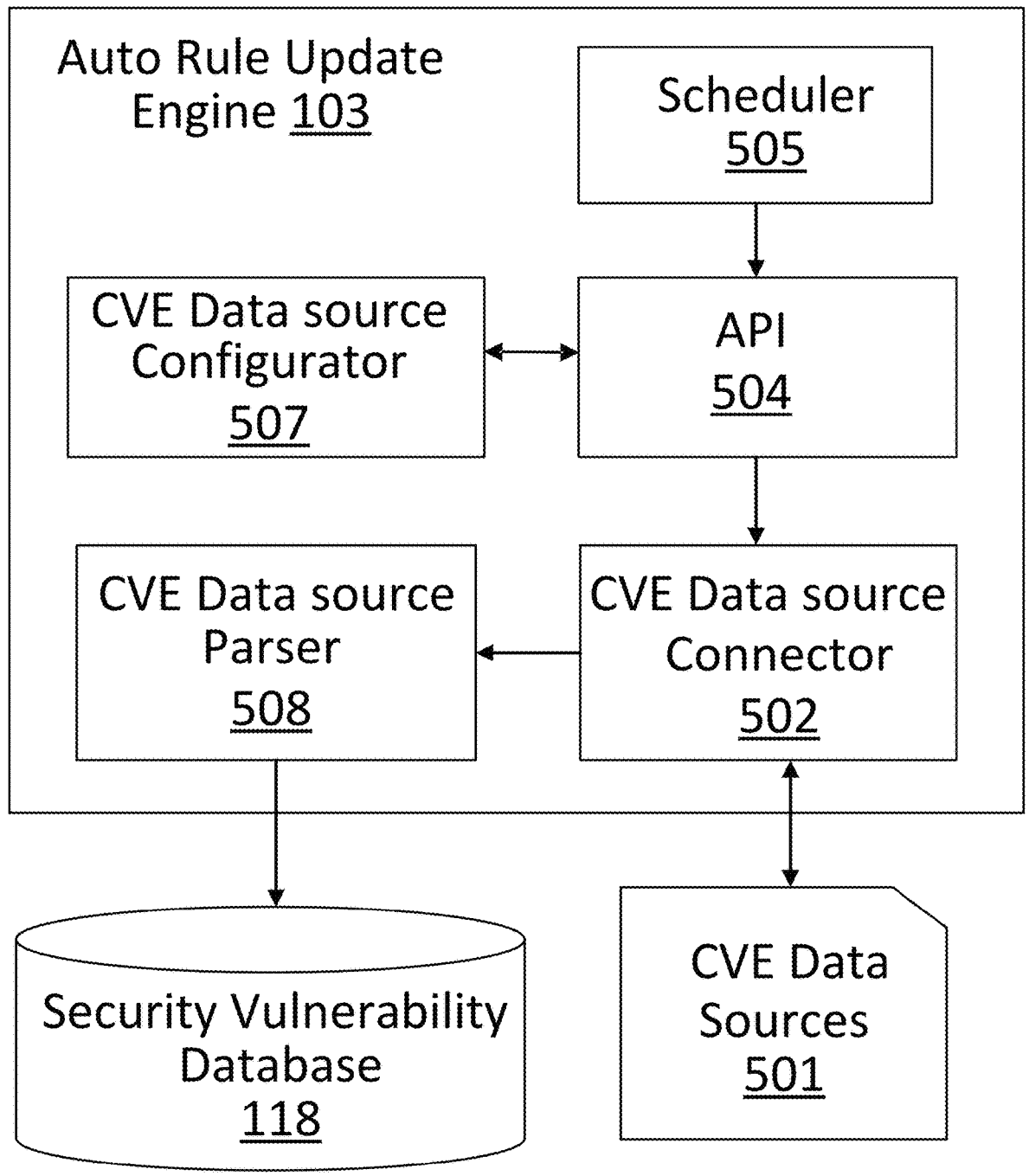
FIG. 5 is a block diagram illustrating an embodiment of an auto rule update engine for implementing the exemplary system depicted in FIG. 1, in accordance with certain embodiments of the present disclosure.

FIG. 5 illustrates an embodiment of an auto rule update engine 103 for updating the security vulnerabilities, and/or security rules, stored in the security vulnerability database 118 based on CVEs received from a CVE data source 501, such as a CVE database 127 or an external system 120 of a CNA (e.g., Debian or RedHat). The auto rule update engine 103 may include a CVE data source connector 502 that connects to a CVE data source 501 based on an API call (not shown) received from an API 504 of the auto rule update engine 103. At regular intervals, a scheduler 505 may trigger the API 504 to initiate an update of the security vulnerabilities, and/or security rules, stored in the security vulnerability database 118. In some embodiments, the API 504 may initiate an update upon such predetermined time intervals set by the scheduler 505, and/or upon certain occurrences, events, or requests. For example, an update may be requested by the API 504 from the CVE data source 501 in response to a CVE update request (not shown) received from the scan engine 101 upon the occurrence of a scan request, as described above. Further, the API 504 may receive configuration data (not shown) used to connect to the CVE data source 501. The configuration data may be received from a CVE data source configurator 507, which may contain the configuration data of the various CVE data sources 501. The auto rule update engine 103 may also include a CVE data source parser 508 that may arrange CVE data (not shown), which may be received from the CVE data source 501 in different formats, into a uniquely format compatible with the security vulnerability database 118. The reformatted CVE data may include the CVE identification numbers 125 and the CVE descriptions 126 of CVEs, as illustrated in FIG. 20.

Referring back to FIG. 5, the CVE data source parser 508 may update the security vulnerability database 118. In certain embodiments, this updating step may include adding new rows to a table in the security vulnerability database 118 that represent newly received CVEs. In some embodiments, the CVE data may also include severity ratings 510 (as shown in FIG. 21) that characterize the severity of security vulnerabilities. Such severity ratings 510 may be predetermined and assigned to CVEs by the Common Vulnerability Scoring System (CVSS), which was launched by the U.S. National Infrastructure Advisory Council (NIAC) in 2005 and is currently maintained by the Forum of Incident Response and Security Teams (FIRST). In an embodiment, severity ratings 510 may be assigned and/or adjusted by the auto rule update engine 103.

Figure 6:
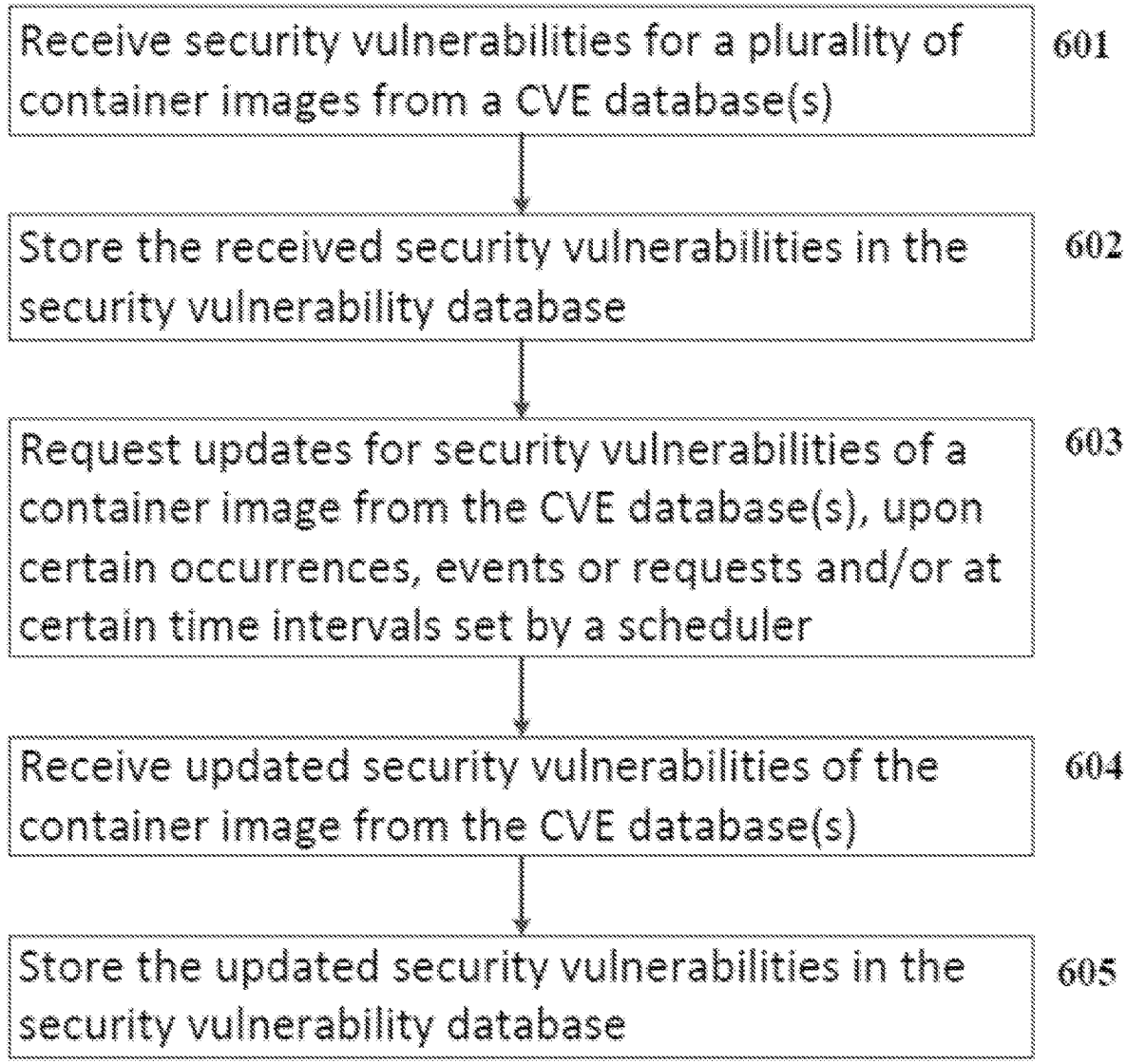
FIG. 6 is a flow diagram illustrating an example of a method implemented by the auto rule update engine depicted in FIG. 5, in accordance with certain embodiments of the present disclosure.

As shown in FIG. 6, the auto rule update engine 103 may implement a method that includes the initial steps of: pulling or receiving security vulnerabilities from a CVE database(s) 127 (block 601); and storing those security vulnerabilities in the security vulnerability database 118 (block 602). These two steps (blocks 601, 602) may be part of a setup or installation of the system 100, wherein the entire contents of the CVE database(s) 127 (i.e., security vulnerabilities for a plurality of images 111) are loaded into the security vulnerability database 118. Accordingly, such a "data dump" may not reference a particular image 111. The method may further include the steps of: requesting the latest, updated security vulnerabilities of an image 111 from the CVE database(s) 127 (block 603); receiving the updated security vulnerabilities of an image 111 from the CVE database(s) 127 (block 604); and storing the updated security vulnerabilities in the security vulnerability database 118 (block 605). These three steps (blocks 603, 604, 605) may be performed at regular intervals, e.g. every two hours. For example, in certain embodiments, the scheduler 505 may be set to a predetermined time interval when the scheduler 505 triggers or prompts the API 504 to request/initiate (block 603) an update of the security vulnerabilities, and/or security rules stored in the security vulnerability database 118. In some embodiments, the API 504 of the auto rule update engine 103 may initiate (block 603) an update from the CVE data source 501 upon receiving a CVE update request from the scan engine 101, which may be transmitted upon the scan engine 101 receiving a scan request to scan an image 111.

Figure 7:
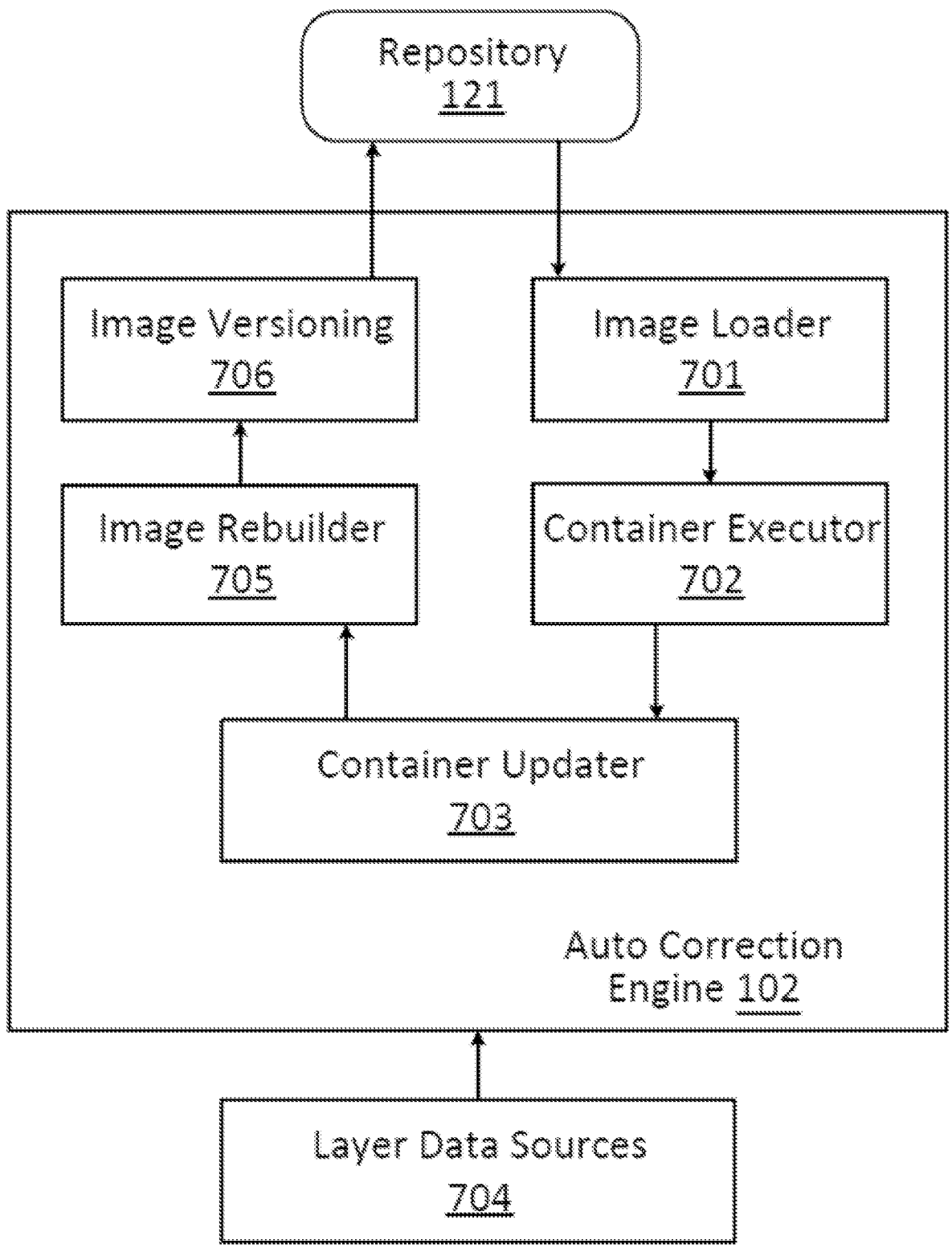
FIG. 7 is a block diagram illustrating an embodiment of an auto correction engine for implementing the exemplary system depicted in FIG. 1, in accordance with certain embodiments of the present disclosure.

FIG. 7 illustrates an embodiment of an auto correction engine 102 for updating the container image 111. In certain embodiments, the auto correction engine 102 may automatically initiate an update of an image 111 upon receiving the image 111 from a container image repository 121. In some embodiments, the auto correction engine 102 may automatically initiate an update of an image 111 upon analyzing scan results for an image 111 and determining that the security vulnerabilities identified in the scan results are severe enough to require a security patch/update for the scanned image 111. For example, such a severity determination may determine whether the security vulnerability has a severity rating 510 that is high or critical, as defined by the current CVSS. According to the qualitative severity rating scale for the most recent version of the scoring system, CVSS v3.1, the qualitative severity ratings 510 are mapped to CVSS scores (not shown), as follows: a CVSS score of 0.0 receives a "None" severity rating 510; a 0.1-3.9 CVSS score is assigned a "Low" severity rating 510; a CVSS score of 4.0-6.9 is a "Medium" severity rating 510; a CVSS score of 7.0-8.9 is a "High" severity rating 510; and a CVSS score of 9.0-10.0 is a "Critical" severity rating 510. The CVEs stored in the security vulnerability database 118 may include severity ratings 510 and/or CVSS scores. In some embodiments, the CVE data may include CVSS scores, and the severity determination may be based on the CVSS score for the security vulnerability as opposed to the qualitative rating.

As shown in FIG. 7, an auto correction engine 102 may include an image loader 701 that may pull or receive the image 111 to be updated from a container image repository 121. The repository 121 may be private or public. The auto correction engine 102 may further include a container executer 702, which may execute the received image 111 in the form of an interactive container. In addition, the auto correction engine 102 may include a container updater 703 that may update the container with a security patches/updates received from an image layer data source 704. In an embodiment, the security update may be stored in the security vulnerability database 118, so that the auto correction engine 102 may first check the security vulnerability database 118 for a security update to rectify a security vulnerability identified in scan results for images 111. The auto correction engine 102 may also include an image rebuilder 705 that may save the security updates made to the container, and rebuild the image 111. In certain embodiments, the auto correction engine 102 may include an image versioning 706 that may generate a new version of the image 111 that has the security updates.

As referenced above, the memory 106 may include generated GUIs that the processor 107 is configured to cause to be displayed. FIGS. 8-19 illustrate examples of such GUIs in accordance with certain embodiments of the present disclosure. FIG. 8 is an example of an admin UI 109 through which a private image 111 (not shown) for a container (not shown) may be scanned by the system 100. The following information may be entered through the GUI to identify the private image 111 to be scanned: an image name 412, image type 413, container image registry 414, project name 415, and private registry login credentials 801. Upon entering such information, an admin may click the "scan" button 802 to submit the scan request.

FIG. 9 is an example of an admin UI 109 through which a public image 111 (not shown) for a container (not shown) may be scanned by the system 100. The following information may be entered through the GUI to identify the public image 111 to be scanned: an image name 412, image type 413, container image registry 414, and project name 415. Upon entering such information, an admin may click the "scan" button 901 to submit the scan request to the scan engine 101 and initiate an image scan (not shown).

Figure 10:
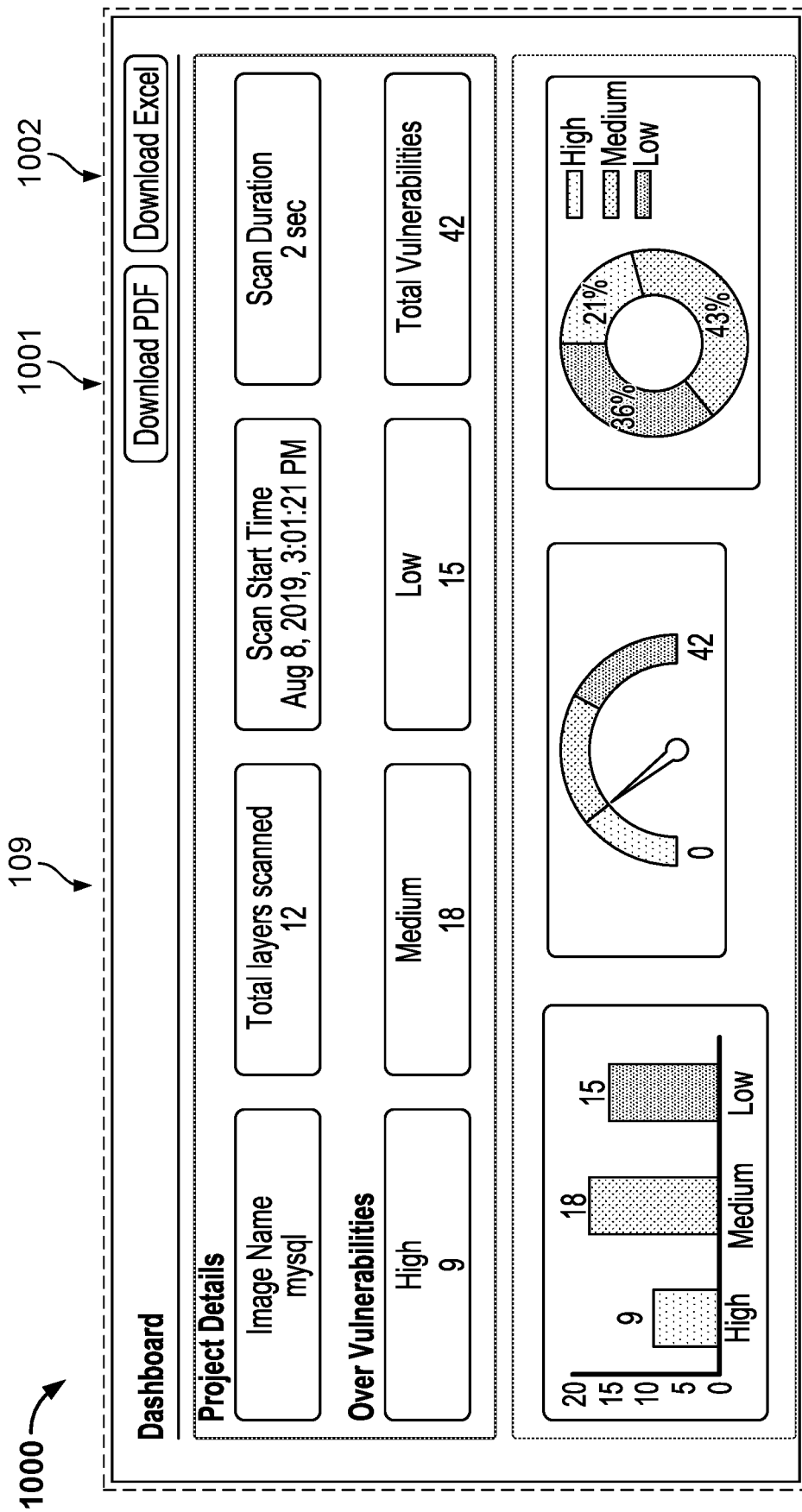
FIG. 10 illustrates an exemplary graphical user interface for a dashboard depicting details of a scan of an image by the exemplary system depicted in FIG. 1, in accordance with certain embodiments of the present disclosure.

Upon running an image scan, a scan report may be generated in various formats. FIG. 10 illustrates an example of an admin UI 109 including a dashboard 1000 that depicts an executive view 203 generated by the report engine 104 for a scan of an image 111 (not shown) by the system 100. The executive view 203 may render the following scan results: the image name, the total layers scanned, the scan start time, the scan duration, the overall number of security vulnerabilities, and the number of security vulnerabilities based on the severity ratings 510 (e.g., high, medium, and low). Graphical representations of the number of security vulnerabilities based on the severity ratings 510 may also be displayed via a pie chart, a bar graph, and a gauge chart. When an admin clicks the "Download PDF" button 1001 or the "Download Excel™" button 1002 displayed in the dashboard 1000, the report engine 104 may generate the requested downloadable file (not shown) that renders the scan results. Such files may be transmitted to the admin via the admin UI 109.

FIG. 11 is an example of an admin UI 109 including a dashboard 1000 that depicts CVEs that were identified by the image scan. The report engine 104 may generate such a CVE listing, which may include columns for the following information: the CVE identification numbers 125, the CVE descriptions 126, the severity ratings 510, and CVE reference links (e.g., a URL or Uniform Resource Locator) 1100 linked to webpages that may provide additional details about the security vulnerabilities identified by the image scan. In an embodiment, the CVE reference links 1100 may be interactive, having embedded hyperlinks, so that an admin may click the links in order to be redirected to the referenced webpage via a web browser.

FIG. 12 is an example of an admin UI 109 depicting historical data 1200 for scans of images 111. This scan history 1200 may be received by the report engine 104 from the scan results database 117. The historical data 1200 may be filtered by project name 415. In an embodiment, the historical data 1200 may be searched by image name 412. This admin UI 109 may display historical data 1200 for each image scan, including: image names 412, project names 415, scan date and time, the number of scanned image layers 114, and a link 1204 to the scan reports. In addition, the admin UI 109 may display checkboxes 1201 in order to select image scans for vulnerability comparisons (not shown). Upon selecting two or more image scans by checking their corresponding checkbox 1201, an admin may click the "Compare Vulnerabilities" button 1203 in order to run a vulnerability comparison. As described above, the vulnerability comparison may compare the security vulnerabilities between the two versions of the same image 111. Accordingly, the vulnerability comparisons may identify the success rate of the updated CVEs and/or the updated security rules based on the newly received CVEs and/or the security patches/updates used to update a container.

FIG. 13 is an example of an admin UI 109 depicting two checkboxes 1201 selected for two image scans of two versions of the image 111, which may have matching image names 412. Upon clicking the "Compare Vulnerabilities" button 1203, a vulnerability comparison (not shown) may be generated for each CVE identified by the selected image scans for the scanned image 111.

Figure 14:
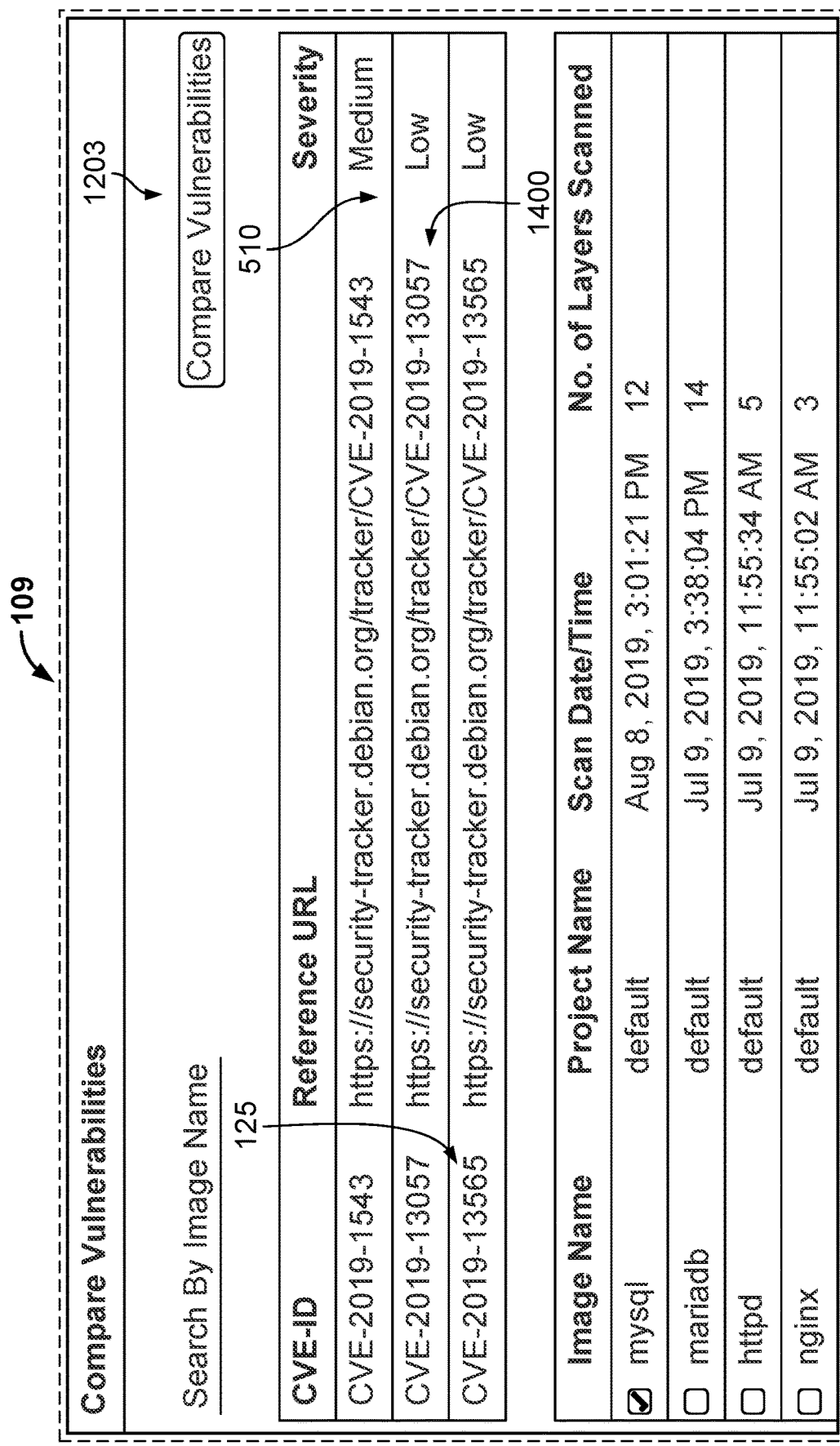
FIG. 14 illustrates an exemplary graphical user interface through which reference links may be clicked to access details of security vulnerabilities identified by scanning images with the exemplary system depicted in FIG. 1, in accordance with certain embodiments of the present disclosure.

FIG. 14 is an example of an admin UI 109 rendering the vulnerability comparisons for those two image scans. A vulnerability comparisons may list CVEs for each security vulnerabilities identified by the compared image scans. This admin UI 109 may display the following information for each CVE dentified by the image scans for the scanned image 111: the CVE identification number 125; a comparison link 1400 to the vulnerability comparisons; and the severity rating 510. Such information may be received by the report engine 104 from the security vulnerability database 118.

FIG. 15 is an example of an admin UI 109 for adding new users to the disclosed system 100. The system 100 searches a user database (not shown) to verify that the user name 1500 for the new user is not already listed in the user database. The new user name 1500 can be assigned a user role 1501 of admin or user. In addition, the new user name 1500 can be assigned a user password (not shown). This admin UI 109 may be further configured to enable the deletion of a user name 1500, or to edit the profile or user credentials (e.g., assigned name, password, role, and permissions) of a user name 1500. Upon entering a new user name 1500, password and user role 1501, an admin may click the "ADD USER" button 1503 in order to add the new user name 1500 to the system 100.

Figure 17:
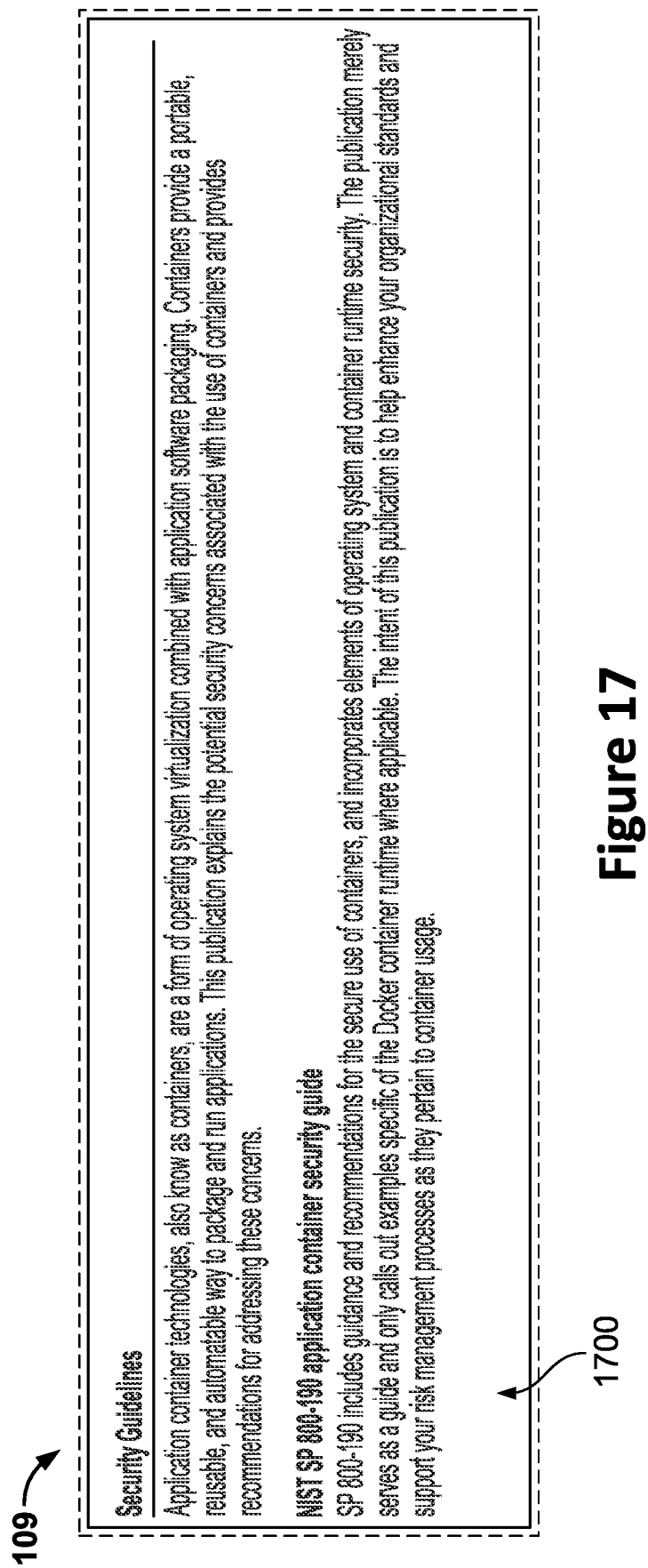
FIG. 17 illustrates an exemplary graphical user interface listing security guidelines, recommendations and/or practices for the secure use of containers through use of the exemplary system depicted in FIG. 1, in accordance with certain embodiments of the present disclosure.
Figure 18:
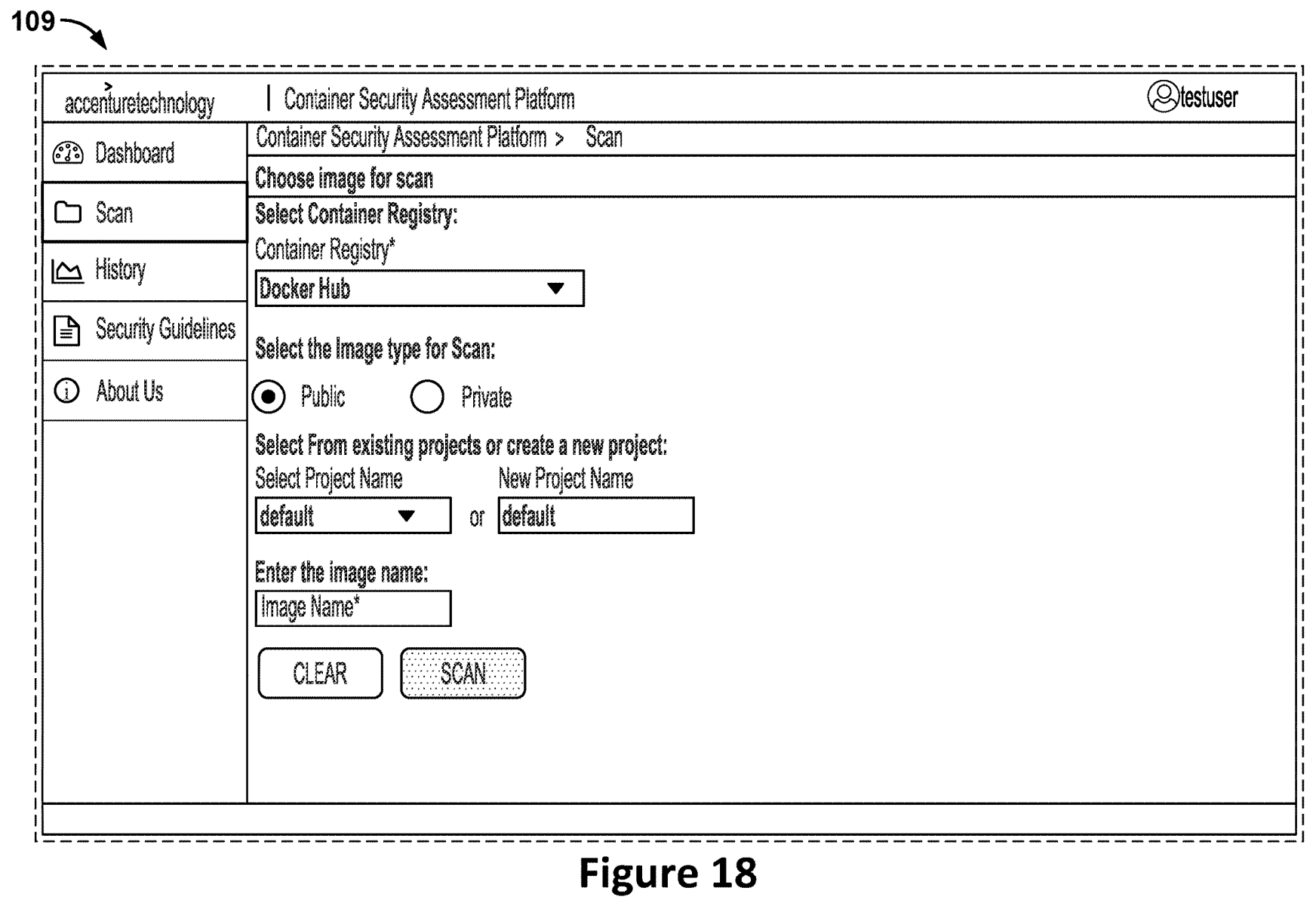
Figure 19:
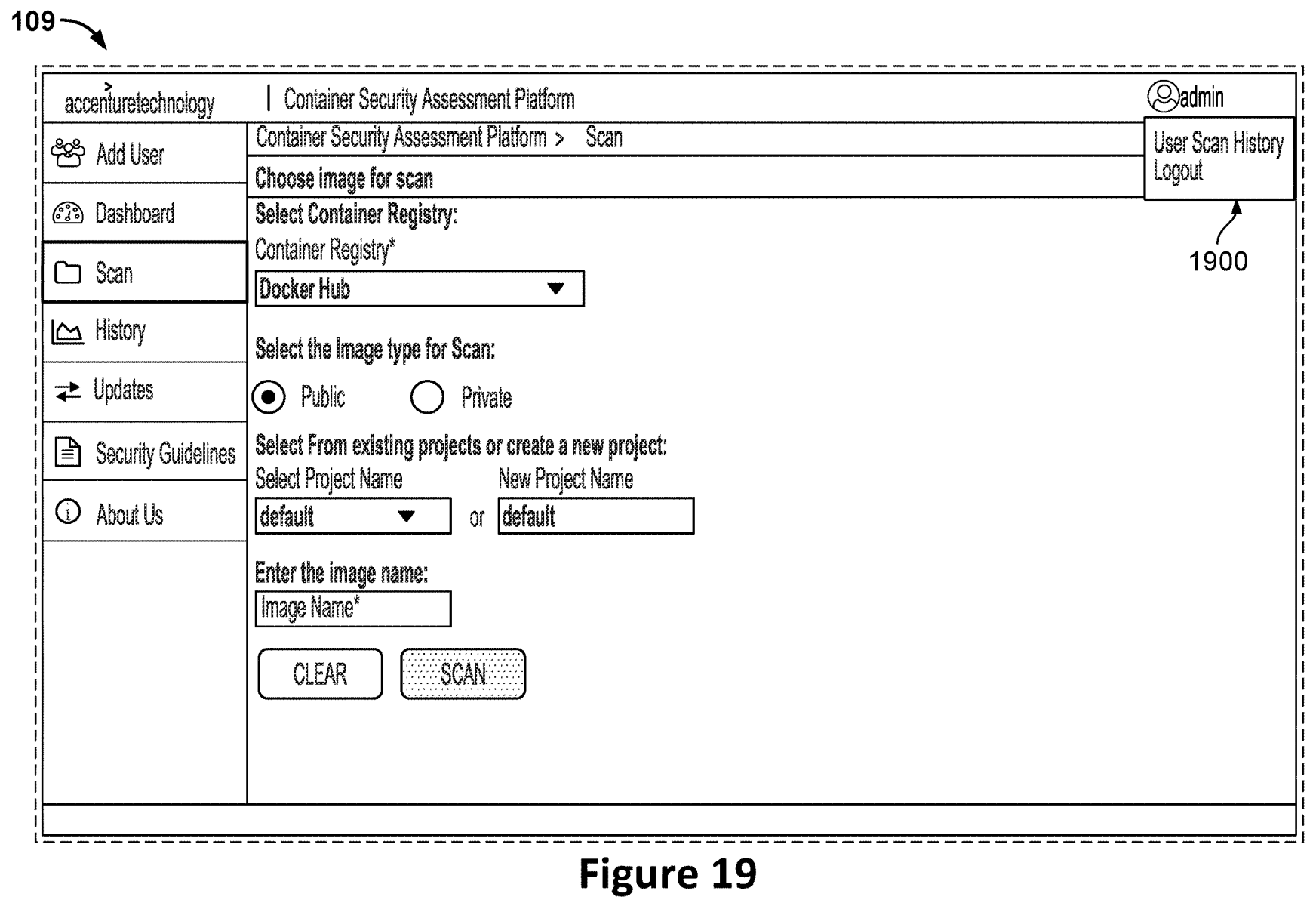

FIG. 16 is an example of an admin UI 109 for listing the latest CVEs for security vulnerabilities that have been added to the security vulnerability database 118. This admin UI 109 may list the CVE identification number 125 for each CVE. The admin UI 109 may also list the CVE updated time 1600 for each CVEs. As shown in FIG. 17, security guidelines and best practices 1700 may posted via an admin UI 109 in order to provide users with instructions and recommendations for the secure use of containers and images 111. FIGS. 18-19 are examples of a scan UI 108 and an admin UI 109, respectively. Such GUIs may include a drop-down menu 1900 to logout of the system 100.

As noted above, FIG. 20 illustrates an exemplary list of CVEs that may be stored in a table residing in the security vulnerability database 118. This table may include columns for the CVE identification number 125 and the CVE description 126. FIG. 21 illustrates two exemplary lists of CVEs and their corresponding severity ratings 510. These lists may be stored in a dataset or table/spreadsheet 2100 residing in the security vulnerability database 118. These tables may each include columns for the CVE identification number 125, the CVE description 126, and the severity ratings 510 for each security vulnerability compared between two versions of an image 111 (e.g., an initial image 111, and the corresponding updated image 111 generated from a modified version of the initial container instantiated from the initial image 111).

In some embodiments, the computer device 105 may include communication interfaces, system circuitry, input/output (I/O) interface circuitry, and display circuitry. The graphical user interfaces (GUIs) displayed by the display circuitry may be representative of GUIs generated by the system 100 to present a query to an enterprise application or end user. The graphical user interfaces (GUIs) displayed by the display circuitry may also be representative of GUIs generated by the system 100 to receive query inputs. The GUIs may be displayed locally using the display circuitry, or for remote visualization, e.g., as HTML, JavaScript, audio, and video output for a web browser running on a local or remote machine. The GUIs and the I/O interface circuitry may include touch sensitive displays, voice or facial recognition inputs, buttons, switches, speakers and other user interface elements. Additional examples of the I/O interface circuitry includes microphones, video and still image cameras, headset and microphone input/output jacks, Universal Serial Bus (USB) connectors, memory card slots, and other types of inputs. The I/O interface circuitry may further include magnetic or optical media interfaces (e.g., a CDROM or DVD drive), serial and parallel bus interfaces, and keyboard and mouse interfaces.

The communication interfaces may include wireless transmitters and receivers (herein, "transceivers") and any antennas used by the transmit-and-receive circuitry of the transceivers. The transceivers and antennas may support Wi-Fi™ network communications, for instance, under any version of IEEE 802.11, e.g., 802.11n or 802.11ac, or other wireless protocols such as Bluetooth™, Wi-Fi™, WLAN™, cellular (4G, LTE/A). The communication interfaces 202 may also include serial interfaces, such as universal serial bus (USB), serial ATA, IEEE 1394, I²C™, slimBus™, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry may include any combination of hardware, software, firmware, APIs, and/or other circuitry. The system circuitry may be implemented, for example, with one or more systems on a chip (SoC), servers, application specific integrated circuits (ASIC), field programmable gate arrays (FPGA), microprocessors, discrete analog and digital circuits, and other circuitry. The system circuitry may implement any desired functionality of the system 100. As just one example, the system circuitry may include one or more instruction processor 107 and memory 106.

The processor 107 may be one or more devices operable to execute logic. The logic may include computer executable instructions or computer code embodied in the memory 106 or in other memory that when executed by the processor 107, cause the processor 107 to perform the features implemented by the logic. The computer code may include instructions executable with the processor 107. Logic, such as programs or circuitry, may be combined or split among multiple programs, distributed across several memories and processors, and may be implemented in a library, such as a shared library (e.g., a dynamic link library or DLL).

The memory 106 stores, for example, control instructions for executing the features of the disclosed system 100, as well as the operating system 129. Examples of the memory 106 may include non-volatile and/or volatile memory, such as a random access memory (RAM), a read-only memory (ROM), an erasable programmable read-only memory (EPROM), or flash memory. Alternatively or in addition, the memory 106 may include an optical, magnetic (hard-drive) or any other form of data storage device. In one implementation, the processor 107 executes the control instructions and the operating system 129 to carry out any desired functionality for the disclosed system 100, including without limitation those attributed to data receiver (e.g., relating to the data receiver circuitry), GUI generation, image layer 114 generation, image 111 generation, and/or scan results generation. The control parameters may provide and specify configuration and operating options for the control instructions, operating system 129, and other functionality of the computer device 105.

The computer device 105 may further include various data sources, as described herein. Each of the databases that are included in the data sources may be accessed by the system 100 to obtain data for consideration during any one or more of the processes described herein. For example, the data receiver circuitry may access the data sources to obtain the information for generating the images 111 and the scan results. In an embodiment, a data receiver circuitry may be configured to receive an image 111.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Figure 22:
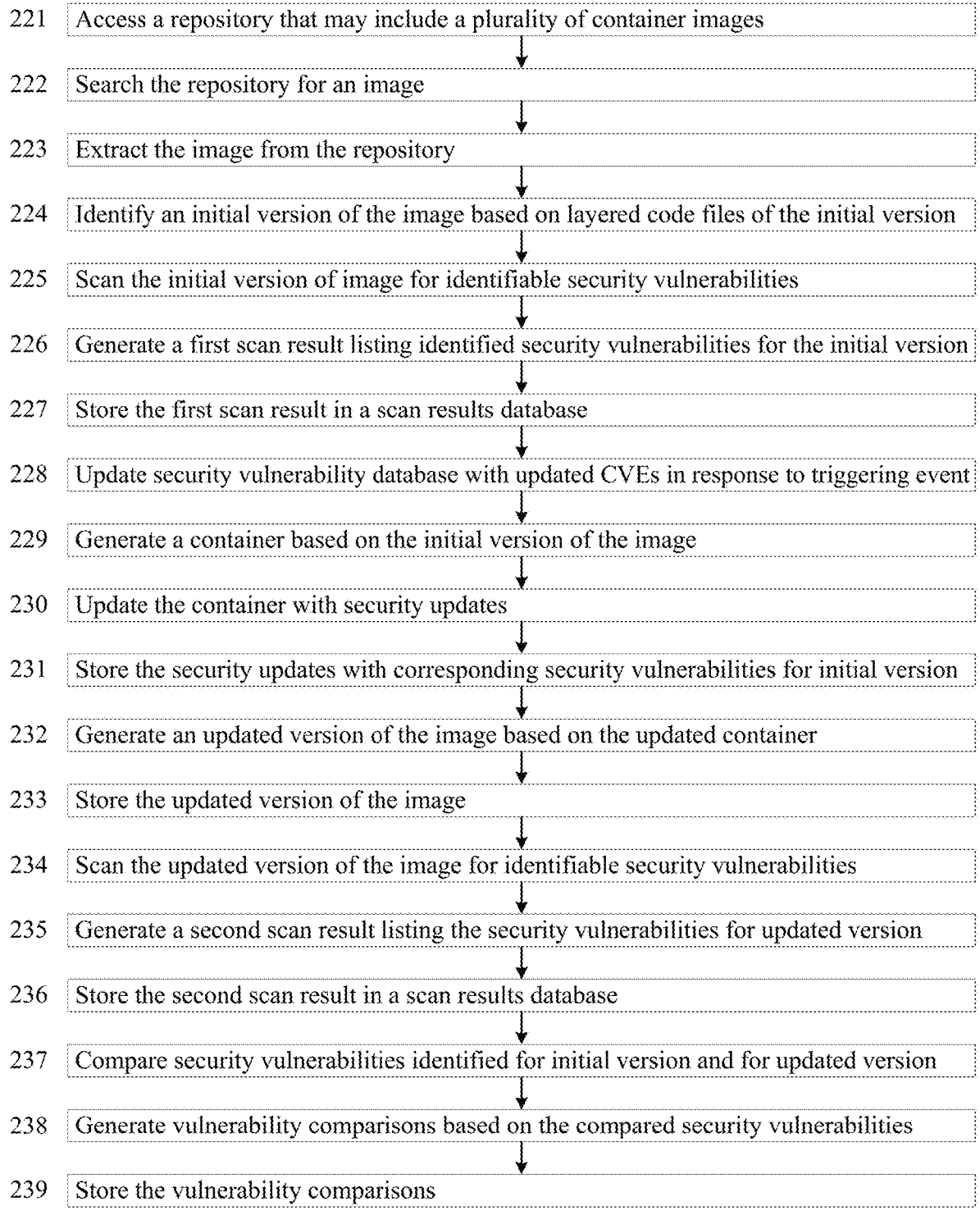
FIG. 22 is a flowchart illustrating an embodiment for a method performed by the exemplary system depicted in FIG. 1, in accordance with certain embodiments of the present disclosure.

FIG. 22 illustrates another example of a method that may be implemented by the system 100, the computing device 105 (not shown), a computer-readable medium (not shown), a PaaS product, and/or circuitry components as described herein. In such embodiments, the method may enable the identification of security vulnerabilities related to containerization platforms. The method may include the steps of: accessing a repository (block 221); searching the repository for an image (block 222); extracting the image from the repository (block 223). The repository may include a plurality of container images. The image may include layered code files. The processor may be adapted to execute the layered code files to generate an image container configured to deploy an executable application adapted to run on an operating system.

In addition, the method may include the steps of: identifying an initial version of the image based on the layered code files (block 224); and scanning the initial version of image for identifiable security vulnerabilities (block 225). The identifiable security vulnerabilities may have Common Vulnerabilities and Exposures (CVE) identification numbers that may be stored in a security vulnerability database. The processor may be adapted to access the security vulnerability database. Further, the method may include the steps of: generating a first scan result listing the identified security vulnerabilities for the initial version of the image (block 226); and storing the first scan result in a scan results database (block 227). The processor may be adapted to access the scan results database.

In certain embodiments, the method may include the step of updating the security vulnerability database with updated CVE information in response to a triggering event (block 228). The updated CVE information may be received from an external CVE database. The updated CVE information may comprise information relating to newly identified security vulnerabilities, and/or the latest information relating to the security vulnerabilities that are already stored in a security vulnerability database. The triggering event may be selected from a group consisting of a lapse of a predetermined time interval, and/or a scan request. In some embodiments, the method may include the steps of: generating a container based on the initial version of the image (block 229); updating the container with security updates (block 230); storing the security updates in the security vulnerability database with the corresponding identified security vulnerabilities for the initial version of the image (block 231); generating an updated version of the image based on the updated container (block 232); and storing the updated version of the image (block 233). The security updates may be configured to remedy the identified security vulnerabilities. The updated container may be stored in the memory.

In an embodiment, the container may be automatically generated and updated with security updates when the initial version of the image is extracted and identified. The security vulnerability database may include severity ratings for the identified security vulnerabilities. In an embodiment, the container may be automatically generated and updated with security updates in response to a determination that the severity ratings for at least one of the identified security vulnerabilities for the initial version of the image is high or critical.

In yet another embodiment, the method may include the steps of: scanning the updated version of the image for identifiable security vulnerabilities (block 234); generating a second scan result listing the identified security vulnerabilities for the updated version of the image (block 235); and storing the second scan result in a scan results database (block 236). Further, the method may include the steps of: comparing the security vulnerabilities identified for the initial version of the image with the security vulnerabilities identified for the updated version of the image (block 237); generating vulnerability comparisons based on the compared security vulnerabilities (block 238); and storing the vulnerability comparisons (block 239).

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A system for identifying security vulnerabilities related to containerization platforms, comprising:
    a memory to store executable instructions; and
    a processor adapted to access the memory, the processor further adapted to execute the executable instructions stored in the memory to:
        access a repository, the repository including a plurality of container images;
        search the repository for a first image among the plurality of container images;
        extract the first image from the repository, the first image comprising layered code files;
        automatically execute, for purpose of a vulnerability rectification of the first image, the layered code files to instantiate an interactive image container configured to deploy an executable application adapted to run on an operating system;
        automatically scan the first image for identifiable security vulnerabilities based on a set of security rules and Common Vulnerabilities and Exposures (CVE), the identifiable security vulnerabilities having CVE identification numbers stored in a security vulnerability database, the processor adapted to access the security vulnerability database;
        automatically update the interactive image container to generate an updated interactive image container by executing a set of security patches in the interactive image container, the set of security patches configured to remedy the identified security vulnerabilities via the interactive image container rather than the first image, the updated interactive image container stored in the memory;
        automatically generate a first scan result listing the identified security vulnerabilities for the first image;
        automatically generate an updated version of the first image based on the updated interactive image container;
        store the first scan result in a scan results database, the processor adapted to access the scan results database;
        automatically update the set of security rules and CVE;
        scan the updated version of the first image for identifiable security vulnerabilities using the updated set of security rules and the updated CVE to generate a second scan result listing security vulnerabilities of the updated version of the first image under the updated set of security rules and CVE; and
        provide a user interface to depict a comparison between the first scan result and the second scan result as a graphical representation of numbers of security vulnerabilities based on security ratings via a pie chart, a bar graph, and a gauge chart.

2. The system of claim 1, wherein:
    automatically updating the security rules and CVE is in response to a triggering event, the updated CVE being received from a CVE database external to the system, the triggering event selected from the group consisting of: a lapse of a predetermined time interval; and a scan request.

3. The system of claim 1, wherein the processor is further adapted to:
    store the set of security patches in the security vulnerability database with corresponding identified security vulnerabilities for the first image; and
    store the updated version of the first image.

4. The system of claim 1, wherein the security vulnerability database includes severity ratings for the identified security vulnerabilities, and wherein the interactive image container is automatically generated and updated with security updates in response to a determination that the severity ratings for at least one of the identified security vulnerabilities for the first image reach a threshold level.

5. The system of claim 1, further comprising:
    a computer device that includes the memory and the processor, the repository is external to the computer device, the computer device adapted to communicate with the repository, the security vulnerability database and the scan results database are stored in the memory, the computer device adapted to communicate with a screen display, the processor configured to generate a user interface configured to display the scan results via the screen display, the processor is further adapted to generate a downloadable file based on the scan results;
    wherein the user interface is further configured to receive image information corresponding to the first image, the image information comprising an image name, image type, container image registry, and project name, and wherein the search of the repository is based on the image name;
    wherein the user interface is further configured to display scan histories for the scan results of image scans, the scan histories comprising the image name, the project name and scan time for the image scans;
    wherein the user interface is further configured to display stored vulnerability comparisons, the stored vulnerability comparisons comprising the CVE identification numbers, CVE reference links and severity ratings for compared security vulnerabilities; and
    wherein the processor is further adapted to add user credentials to the system for the user to access the system, the user interface further configured to receive a user name, a user password, a user role, and user permissions for the user credentials.

6. A method for identifying security vulnerabilities related to containerization platforms by a processor, comprising the steps of:
    accessing a repository, the repository including a plurality of container images;
    searching the repository for a first image among the plurality of container images;
    extracting the first image from the repository, the image comprising layered code files, the processor adapted to execute, for purpose of a vulnerability rectification of the first image, the layered code files to instantiate an interactive image container configured to deploy an executable application adapted to run on an operating system;
    automatically scanning the first image for identifiable security vulnerabilities based on a set of security rules and Common Vulnerabilities and Exposures (CVE), the identifiable security vulnerabilities having CVE identification numbers stored in a security vulnerability database, the processor adapted to access the security vulnerability database;

automatically updating the interactive image container to generate an updated interactive image container by executing a set of security patches in the interactive image container, the set of security patches configured to remedy the identified security vulnerabilities via the interactive image container rather than the first image, the updated interactive image container stored in a memory;

automatically generating a first scan result listing the identified security vulnerabilities for the first image;

automatically generating an updated version of the first image based on the updated interactive image container;

storing the first scan result in a scan results database, the processor adapted to access the scan results database;

automatically updating the set of security rules and CVE;

scanning the updated version of the first image for identifiable security vulnerabilities using the updated set of security rules and the updated CVE to generate a second scan result listing security vulnerabilities of the updated version of the first image under the updated set of security rules and CVE; and providing a user interface to depict a comparison between the first scan result and the second scan result as a graphical representation of numbers of security vulnerabilities based on security ratings via a pie chart, a bar graph, and a gauge chart.

7. The method of claim 6, wherein automatically updating the security rules and CVE is in response to a triggering event, the updated CVE being received from a CVE database, the triggering event selected from the group consisting of:
a lapse of a predetermined time interval; and a scan request.

8. The method of claim 6, further comprising the steps of:
storing the set of security patches in the security vulnerability database with corresponding identified security vulnerabilities the first image; and
storing the updated version of the first image.

9. A non-transitory computer-readable medium including instructions configured to be executed by a processor, wherein the executed instructions are adapted to cause the processor to:
access a repository, the repository including a plurality of container images;
search the repository for a first image among the plurality of container images;
extract the first image from the repository, the first image comprising layered code files;
automatically execute, for purpose of a vulnerability rectification of the first image, the layered code files to instantiate an interactive image container configured to deploy an executable application adapted to run on an operating system;
automatically scan the first image for identifiable security vulnerabilities based on a set of security rules and Common Vulnerabilities and Exposures (CVE), the identifiable security vulnerabilities having CVE identification numbers stored in a security vulnerability database, the processor adapted to access the security vulnerability database;
automatically update the interactive image container to generate an updated interactive image container by executing a set of security patches in the interactive image container, the set of security patches configured to remedy the identified security vulnerabilities via the interactive image container rather than the first image, the updated interactive image container stored in a memory;
automatically generate a first scan result listing the identified security vulnerabilities for the first image;
automatically generate an updated version of the first image based on the updated interactive image container;
store the first scan result in a scan results database, the processor adapted to access the scan results database;
automatically update the set of security rules and CVE;
scan the updated version of the first image for identifiable security vulnerabilities using the updated set of security rules and the updated CVE to generate a second scan result listing security vulnerabilities of the updated version of the first image under the updated set of security rules and CVE; and
provide a user interface to depict a comparison between the first scan result and the second scan result as a graphical representation of numbers of security vulnerabilities based on security ratings via a pie chart, a bar graph, and a gauge chart.

10. The non-transitory computer-readable medium of claim 9, wherein the processor, when adapted to execute the instructions to cause the processor to automatically update the security rules and CVE, such update is made in response to a triggering event, the updated CVE being received from an external CVE database, and the triggering event being selected from the group consisting of: a lapse of a predetermined time interval; and a scan request.

11. The non-transitory computer-readable medium of claim 9, wherein the processor is adapted to execute the instructions to further cause the processor to:
store the set of security patches in the security vulnerability database with corresponding identified security vulnerabilities for the first image; and
store the updated version of the first image.

\* \* \* \* \*